United States Patent
Nakashio et al.

(10) Patent No.: US 9,001,455 B2
(45) Date of Patent: Apr. 7, 2015

(54) MAGNETIC RECORDING MEDIUM, SERVO SIGNAL RECORDING APPARATUS AND METHOD OF PRODUCING MAGNETIC RECORDING MEDIUM

(71) Applicant: Sony Corporation, Tokyo (JP)

(72) Inventors: Eiji Nakashio, Miyagi (JP); Hiroshi Morita, Miyagi (JP); Kiyoyuki Miyata, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/206,709

(22) Filed: Mar. 12, 2014

(65) Prior Publication Data

US 2014/0268414 A1 Sep. 18, 2014

(30) Foreign Application Priority Data

Mar. 15, 2013 (JP) .................................. 2013-053586
Mar. 3, 2014 (JP) .................................. 2014-040945

(51) Int. Cl.
G11B 5/584 (2006.01)
G11B 5/78 (2006.01)
G11B 5/008 (2006.01)

(52) U.S. Cl.
CPC .............. *G11B 5/78* (2013.01); *G11B 5/00817* (2013.01)

(58) Field of Classification Search
None
See application file for complete search history.

(56) References Cited

U.S. PATENT DOCUMENTS 8,749,912 B2* 6/2014 Jubert ........................ 360/77.12
2013/0265672 A1* 10/2013 Johnson et al. ............. 360/97.11
2014/0146412 A1* 5/2014 Johnson et al. ................. 360/46

FOREIGN PATENT DOCUMENTS

JP 2005-166230 6/2005

* cited by examiner

*Primary Examiner* — Andrew L Sniezek
(74) *Attorney, Agent, or Firm* — K&L Gates LLP

(57) ABSTRACT

There is provided a magnetic recording medium including a magnetic layer. The magnetic layer has a servo signal recorded thereon by magnetizing a part of the magnetic layer in a first direction. The first direction contains a component of a perpendicular direction that is perpendicular to a top surface of the magnetic layer. The magnetic layer is pre-magnetized in a second direction before recording of the servo signal. The second direction contains the component of the perpendicular direction. The second direction is opposite to the first direction.

12 Claims, 20 Drawing Sheets

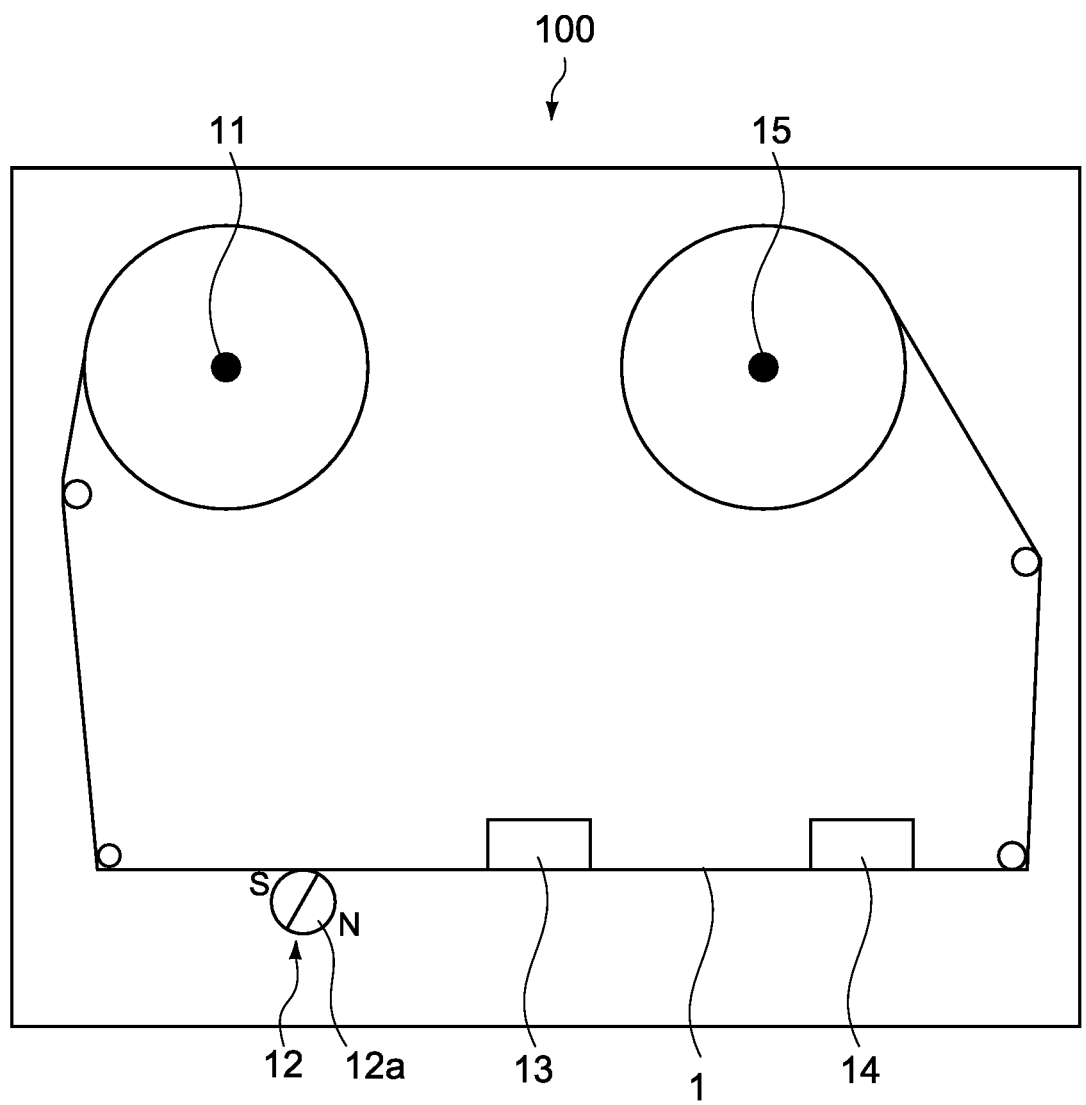
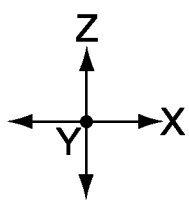
FIG.1

| | Type of tape | Type of magnetic powder | Angle of magnet in pre-processing (°) | Longitudinal squareness ratio | Amount of perpendicular magnetization (%) | Product of the squareness ratio and the amount (%) of perpendicular magnetization | Reproduced waveform | Difference between positive and negative wave-heights was within 5% |
|---|---|---|---|---|---|---|---|---|
| Comp. Ex. 1 | Non-oriented tape 1A | Barium ferrite | 80 | 0.6 | 76 | 0.46 | Over-biased | No |
| Comp. Ex. 2 | Non-oriented tape 1A | Barium ferrite | 70 | 0.6 | 44 | 0.26 | Over-biased | No |
| Ex. 1 | Non-oriented tape 1A | Barium ferrite | 50 | 0.6 | 27 | 0.16 | - | Yes |
| Ex. 2 | Non-oriented tape 1A | Barium ferrite | 24 | 0.6 | 16 | 0.10 | - | Yes |
| Ex. 3 | Non-oriented tape 1A | Barium ferrite | -10 | 0.6 | -30 | -0.18 | - | Yes |
| Comp. Ex. 3 | Non-oriented tape 1A | Barium ferrite | -20 | 0.6 | -44 | -0.26 | Under-biased | No |
| Comp. Ex. 4 | Non-oriented tape 1A | Barium ferrite | -40 | 0.6 | -81 | -0.49 | Under-biased | No |
| Comp. Ex. 5 | Non-oriented tape 1B | Barium ferrite | 80 | 0.42 | 92 | 0.39 | Over-biased | No |
| Comp. Ex. 6 | Non-oriented tape 1B | Barium ferrite | 50 | 0.42 | 64 | 0.27 | Over-biased | No |
| Ex. 4 | Non-oriented tape 1B | Barium ferrite | 24 | 0.42 | 60 | 0.25 | - | Yes |
| Ex. 5 | Non-oriented tape 1B | Barium ferrite | 20 | 0.42 | 12 | 0.05 | - | Yes |
| Comp. Ex. 7 | Non-oriented tape 1B | Barium ferrite | 15 | 0.42 | 7 | 0.03 | Under-biased | No |
| Ex. 6 | Non-oriented tape 1B | Barium ferrite | 0 | 0.42 | -57 | -0.24 | - | Yes |
| Ex. 7 | Non-oriented tape 1B | Barium ferrite | -10 | 0.42 | -62 | -0.26 | - | Yes |
| Comp. Ex. 8 | Non-oriented tape 1B | Barium ferrite | -40 | 0.42 | -92 | -0.39 | Under-biased | No |
| Comp. Ex. 9 | Perpendicularly-oriented tape 1C | Barium ferrite | 30 | 0.22 | 7 | 0.02 | Over-biased | No |
| Comp. Ex. 10 | Perpendicularly-oriented tape 1C | Barium ferrite | 90 | 0.22 | 98 | 0.22 | Over-biased | No |
| Ex. 8 | Perpendicularly-oriented tape 1C | Barium ferrite | 150 | 0.22 | 5 | 0.01 | - | Yes |
| Comp. Ex. 11 | Perpendicularly-oriented tape 1D | Acicular metal | 30 | 0.3 | 7 | 0.02 | Under-biased | No |
| Comp. Ex. 12 | Perpendicularly-oriented tape 1D | Acicular metal | 90 | 0.3 | 82 | 0.25 | Over-biased | No |
| Ex. 9 | Perpendicularly-oriented tape 1D | Acicular metal | 150 | 0.3 | 5 | 0.02 | - | Yes |
| Comp. Ex. 13 | Longitudinally-oriented tape 1E | Acicular metal | -50 | 0.88 | 1 | 0.01 | Under-biased | No |
| Comp. Ex. 14 | Longitudinally-oriented tape 1E | Acicular metal | 50 | 0.88 | 1 | 0.01 | Over-biased | No |
| Comp. Ex. 15 | Longitudinally-oriented tape 1E | Acicular metal | 120 | 0.88 | 1 | 0.01 | Under-biased | No |

FIG.6

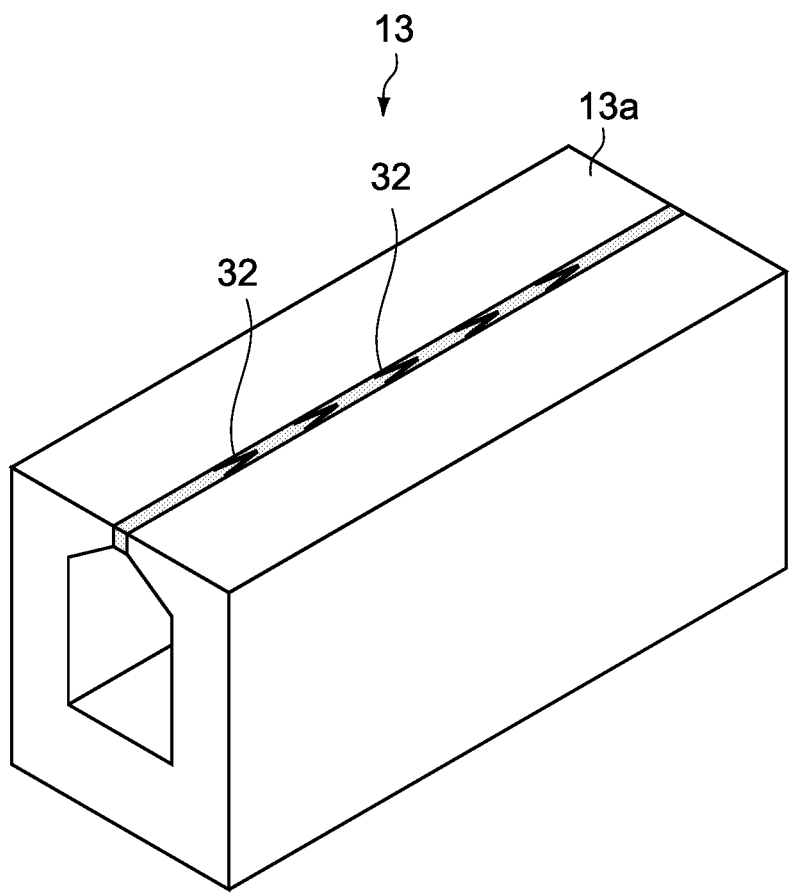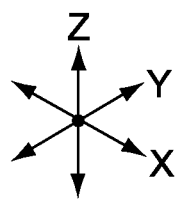
FIG.16

MAGNETIC RECORDING MEDIUM, SERVO SIGNAL RECORDING APPARATUS AND METHOD OF PRODUCING MAGNETIC RECORDING MEDIUM

CROSS REFERENCES TO RELATED APPLICATIONS

The present application claims priority to Japanese Priority Patent Application JP 2013-053586 filed in the Japan Patent Office on Mar. 15, 2013, and Japanese Priority Patent Application JP 2014-040945 filed in the Japan Patent Office on Mar. 3, 2014, the entire content of which is hereby incorporated by reference.

BACKGROUND

The present disclosure relates to the technologies of magnetic recording media including a magnetic layer having servo signals recorded thereon.

In recent years, magnetic recording media are extensively used for electronic data backup. As one example of the magnetic recording media, magnetic tapes having a magnetic layer are widely spread.

The magnetic layer of the magnetic recording medium is provided with a plurality of recording tracks extending in one direction, and the data will be recorded to the recording tracks. In these years, a method of narrowing the distances between the recording tracks has been used for realizing high density recording of the data.

However, when the distances between the recording tracks are narrowed, there is a problem when a magnetic head reads and writes the data on the recording track that the magnetic head may not be able to accurately adjust its position to the recording track. Therefore, usually, a method which includes recording servo signals at the predetermined positions between the recording tracks is employed. The data recording magnetic head would be able to accurately adjust its position to the recording track by reading the servo signals recorded on the magnetic layer.

Examples of known methods for data recording on magnetic recording media include longitudinal magnetic recording which magnetizes some magnetic particles within the magnetic layer in a longitudinal direction to record the data, and perpendicular magnetic recording which magnetizes some magnetic particles within the magnetic layer in a perpendicular direction to record the data. Perpendicular magnetic recording enables the data recording with higher density than longitudinal magnetic recording.

Incidentally, an example of the technique related to the present disclosure is disclosed in Japanese Patent Application Laid-Open No. 2005-166230.

SUMMARY

In longitudinal magnetic recording, the servo signals recorded on the magnetic layer are magnetized along a longitudinal direction. In such a case, the reproduced waveform resulting from reading the servo signals would have a symmetry between positive and negative (±) directions. On the other hand, in perpendicular magnetic recording, when servo signals are recorded on the magnetic layer, the magnetization direction of the servo signals would include a perpendicular component. In such a case where the magnetization direction of servo signals includes a perpendicular component, there is a problem that, unless some action is taken, the reproduced waveform resulting from reading the servo signals would become asymmetric in the positive and negative (±) directions.

In view of the above-mentioned circumstances, it is desirable to provide a technology that enables obtaining a reproduced waveform of servo signals with good symmetry even in cases where the magnetization direction of servo signals includes a perpendicular component.

According to an embodiment of the present disclosure, there is provided a magnetic recording medium including a magnetic layer.

The magnetic layer has a servo signal recorded thereon by magnetizing a part of the magnetic layer in a first direction. The first direction contains a component of a perpendicular direction that is perpendicular to a top surface of the magnetic layer. The magnetic layer is pre-magnetized in a second direction before recording of the servo signal. The second direction contains the component of the perpendicular direction. The second direction is opposite to the first direction.

This allows the magnetization direction of the servo signals recorded on the magnetic layer (first direction containing the component of the perpendicular direction) to be opposite to the direction of the magnetization by pre-processing of the magnetic layer (second direction containing the component of the perpendicular direction). Thus, by making the magnetization direction of the servo signals recorded on the magnetic layer and the direction of the magnetization by pre-processing of the magnetic layer opposite to each other, it enables obtaining a reproduced waveform of servo signals with good symmetry.

In the magnetic recording medium, an absolute value of the product of a rate of an amount of magnetization in the perpendicular direction and a squareness ratio of the magnetic layer in a longitudinal direction may be 0.05 or more and 0.25 or less. The rate of the amount of magnetization in the perpendicular direction is the rate with respect to a maximum amount of magnetization that would be obtained if amounts of magnetization of the magnetic recording medium were measured while turning the magnetic recording medium. The longitudinal direction is a direction parallel to the top surface.

This enables obtaining a reproduced waveform of servo signals with good symmetry.

In the magnetic recording medium, the magnetic layer may contain therein a magnetic powder which is non-oriented or perpendicularly-oriented.

In the magnetic recording medium, the magnetic powder may include barium ferrite or an acicular metal.

According to another embodiment of the present disclosure, there is provided a servo signal recording apparatus including a servo signal recording unit and a pre-processing unit.

A servo signal recording unit is configured to apply a magnetic field to a part of a magnetic layer included in a magnetic recording medium, thereby recording a servo signal by magnetizing a part of the magnetic layer in a first direction. The first direction contains a component of a perpendicular direction that is perpendicular to a top surface of the magnetic layer.

A pre-processing unit is configured to apply a magnetic field to the magnetic layer before the servo signal is recorded by the servo signal recording unit, thereby pre-magnetizing the magnetic layer in a second direction. The second direction contains the component of the perpendicular direction. The second direction is opposite to the first direction.

In the servo signal recording apparatus, the pre-processing unit may have a magnet. The magnet can be turned and can change the magnetic field to be applied to the magnetic layer in accordance with its turning.

This apparatus may allow adjustment of the direction of the magnetization by pre-processing of the magnetic layer (second direction) by turning the magnet.

According to still another embodiment of the present disclosure, there is provided a method of producing a magnetic recording medium, which method includes applying a magnetic field to a part of a magnetic layer included in a magnetic recording medium, thereby recording a servo signal by magnetizing a part of the magnetic layer in a first direction. The first direction contains a component of a perpendicular direction that is perpendicular to a top surface of the magnetic layer.

Before the servo signal is recorded, a magnetic field is applied to the magnetic layer and the magnetic layer is premagnetized in a second direction. The second direction contains the component of the perpendicular direction. The second direction is opposite to the first direction.

Thus, the present disclosure is able to provide a technology that enables obtaining a reproduced waveform of servo signals with good symmetry even in cases where the magnetization direction of servo signals includes a perpendicular component.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

BRIEF DESCRIPTION OF THE FIGURES

FIG. 1 is a front view showing a servo signal recording apparatus according to an embodiment of the present disclosure;

FIG. 6 is a figure showing Examples and Comparative Examples;

FIG. 16 is a perspective view showing a servo signal recording unit as viewed from a recording surface side to record the servo signals;

DETAILED DESCRIPTION

Hereinafter, the embodiments of the present disclosure will be described with reference to the drawings.

[Configurations of Servo Signal Recording Apparatus 100 and Magnetic Tape 1]

Figure 2:
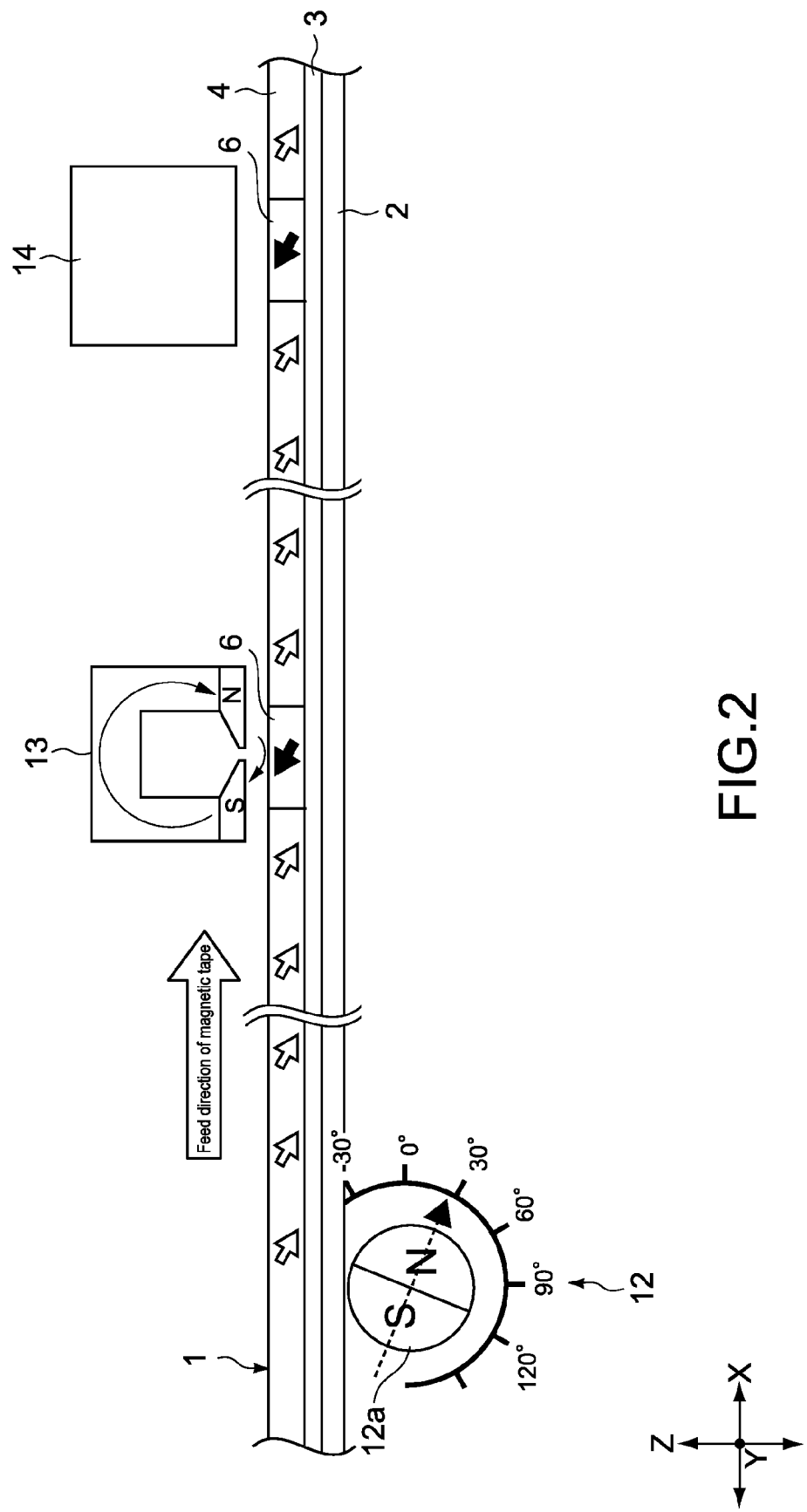
FIG. 2 is an enlarged detail view showing a part of the servo signal recording apparatus.
Figure 3:
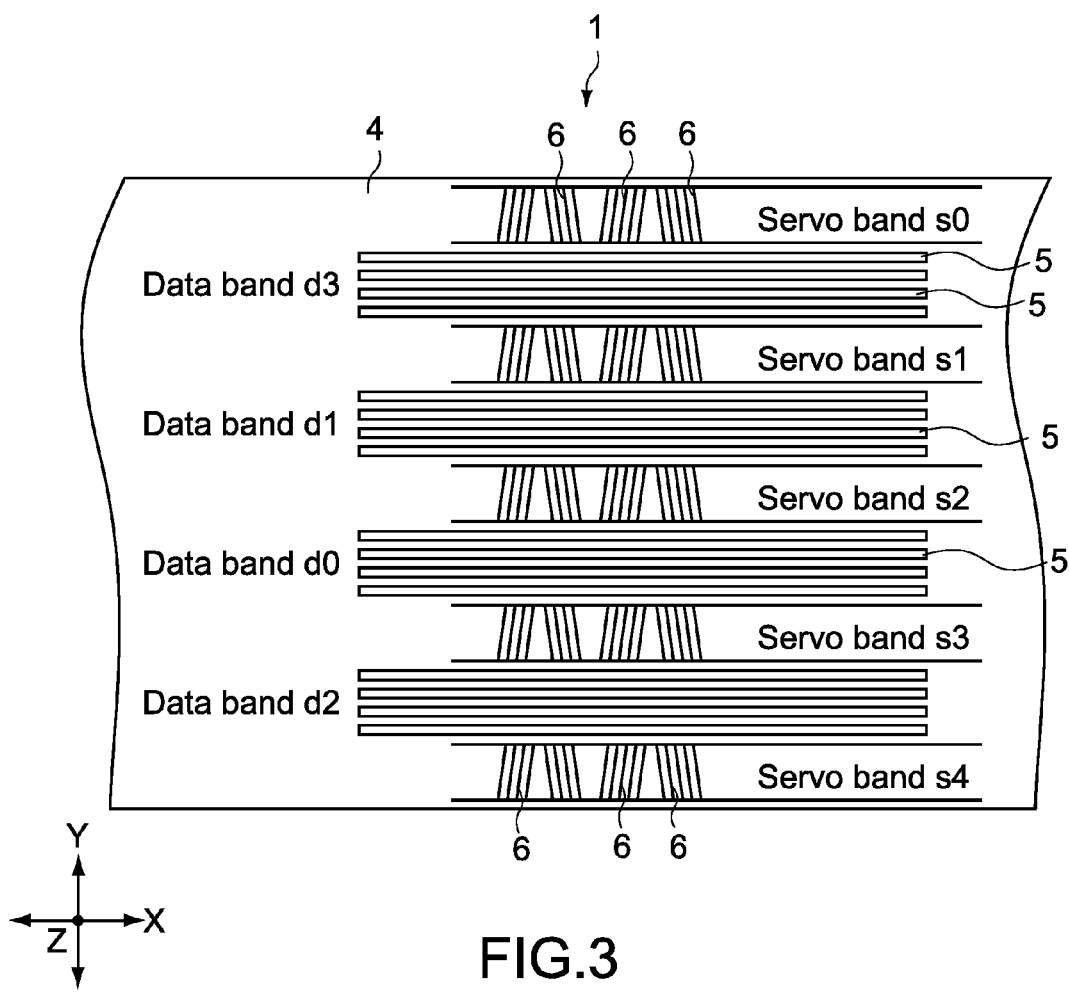
FIG. 3 is a top view showing a magnetic tape having servo signals recorded thereon.

FIG. 1 is a front view showing a servo signal recording apparatus 100 according to an embodiment of the present disclosure. FIG. 2 is an enlarged detail view showing a part of the servo signal recording apparatus 100. FIG. 3 is a top view showing a magnetic tape 1 having servo signals 6 recorded thereon.

First, a configuration of the magnetic tape 1 (magnetic recording medium) will be described with reference to FIGS. 2 and 3. As shown in these figures, the magnetic tape 1 includes a tape-like substrate 2 extending in one direction, a non-magnetic layer 3 laminated on the substrate 2, and a magnetic layer 4 laminated on the non-magnetic layer 3.

Examples of materials that may be used for the substrate 2 include polyethylene terephthalate (PET), polyethylene naphthalate (PEN), and the like. The non-magnetic layer 3 may include, for example, α-Fe2O3, polyurethane, or the like. The magnetic layer 4 may be a ferromagnetic metal film which contains therein a magnetic powder. Examples of the magnetic powder that may be used include non-oriented or perpendicularly-oriented barium ferrite; a perpendicularly-oriented acicular metal; and the like.

The magnetic layer 4 may include a plurality of data bands d (data bands d0 to d3); and a plurality of servo bands s (servo bands s0 to s4) arranged at the positions to sandwich the respective data bands d in their width direction (Y-axis direction). Each data band d includes a plurality of recording tracks 5 extending in the longitudinal direction. Data would be recorded to each of the recording tracks 5. The servo bands s include some servo signals 6 in a predetermined pattern recorded by the servo signal recording apparatus 100. For example, a recording head of a recording apparatus (not shown) that records a variety of data such as electronic data would recognize the position of the recording tracks 5 by reading the servo signals 6 recorded on the magnetic layer.

Referring to FIGS. 1 and 2, the servo signal recording apparatus 100 includes a feed roller 11, a pre-processing unit 12, a servo signal recording unit 13, a reproduction head unit 14 and a take-up roller 15; which are disposed in the mentioned order from the upstream of the feed direction of the magnetic tape 1. It should be noted that although not shown, the servo signal recording apparatus 100 may have a control unit which generally controls various parts of the servo signal recording apparatus 100; a storage unit which stores various programs and data that may be required for the process of the control unit; a display unit which displays the data; and the like.

The feed roller 11 is configured to rotatably support the magnetic tape 1 which is in a roll form (before the servo signals 6 are recorded). The feed roller 11 rotates in accordance with the drive of a driving source such as a motor; and feeds the magnetic tape 1 to the downstream upon rotating.

The take-up roller 15 is configured to rotatably support the magnetic tape 1 which is in a roll form (after the servo signals 6 are recorded). The take-up roller 15 rotates in synchronization with the feed roller 11 in accordance with the drive of a driving source such as a motor; and winds up, upon rotating, the magnetic tape 1 having the servo signals 6 recorded thereon. The feed roller 11 and the take-up roller 15 may be configured to move the magnetic tape 1 at a constant speed in the feeding path.

The servo signal recording unit 13 may be disposed, for example, above the magnetic tape 1 (the magnetic layer 4 side). However, it is not limited thereto, and the servo signal recording unit 13 may also be disposed below the magnetic tape 1 (the substrate 2 side). The servo signal recording unit 13 is configured to produce a magnetic field at a predetermined timing in accordance with pulse signals of rectangular waves, to apply the magnetic field to a part of the magnetic layer 4 (after being pre-processed) of the magnetic tape 1.

In this manner, the servo signal recording unit 13 records the servo signals 6 to the magnetic layer 4 by magnetizing the parts of the magnetic layer 4 in a first direction (indicated in black arrows in FIG. 2). The servo signal recording unit 13 may be configured to record the servo signals 6 to each of the five servo bands s0 to s4 when the magnetic layer 4 passes under the servo signal recording unit 13.

The first direction, which is the magnetization direction of the servo signals 6, contains a component of the perpendicular direction that is perpendicular to the top surface of the magnetic layer 4. Accordingly, in this embodiment, since the magnetic layer 4 contains the magnetic powder which is non-oriented or perpendicularly-oriented, the servo signals 6 recorded on the magnetic layer 4 would contain a perpendicular magnetization component.

Figure 4:
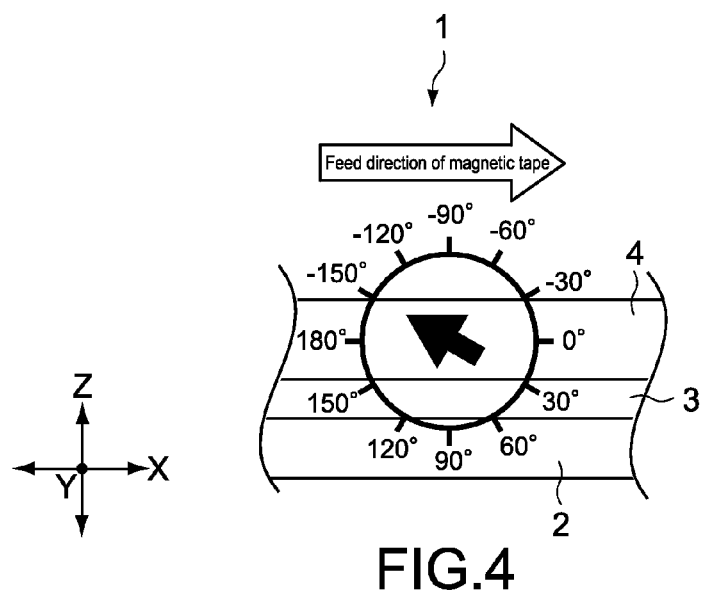
FIG. 4 is a figure showing a direction of magnetization of the magnetic tape.

FIG. 4 is a figure showing a direction of magnetization of the magnetic tape 1. Herein, as shown in FIG. 4, the direction of magnetization will be represented by an angle, with respect to a datum angle (0°) used as representing the state where the direction of magnetization is the same as the feed direction of the magnetic tape 1, and a greater angle indicates the clockwise direction therefrom. FIG. 4 describes the direction of magnetization of the servo signals 6. The magnetization direction of magnetization by pre-processing which will be described later; and the magnetization direction of the whole magnetic layer 4 will be described in the same manner.

The pre-processing unit 12 may be disposed, for example, below the magnetic tape 1 (the substrate 2 side), at the upstream of the servo signal recording unit 13. It is not limited thereto, and the pre-processing unit 12 may also be disposed above the magnetic tape 1 (the magnetic layer 4 side). The pre-processing unit 12 includes a permanent magnet 12a which can be turned about an axis of Y-axis direction (width direction of the tape 1). Examples of the shape of the permanent magnet 12a include, but are not limited to, cylindrical and polygonal shapes.

Before the servo signals 6 are recorded by the servo signal recording unit 13, the permanent magnet 12a applies a magnetic field due to a direct-current magnetic field to the whole of the magnetic layer 4 and demagnetizes the whole magnetic layer 4. Thus, the permanent magnet 12a is able to pre-magnetize the magnetic layer 4 in a second direction before recording of the servo signals 6, which second direction is opposite to the magnetization direction of the servo signals 6 (indicated in white arrows in FIG. 2). In such a manner, by making the two magnetization directions opposite to each other, it allows a reproduced waveform of the servo signals 6 which results from reading the servo signals 6 to be symmetric in the positive and negative (±) directions (see also FIG. 5).

Figure 12:
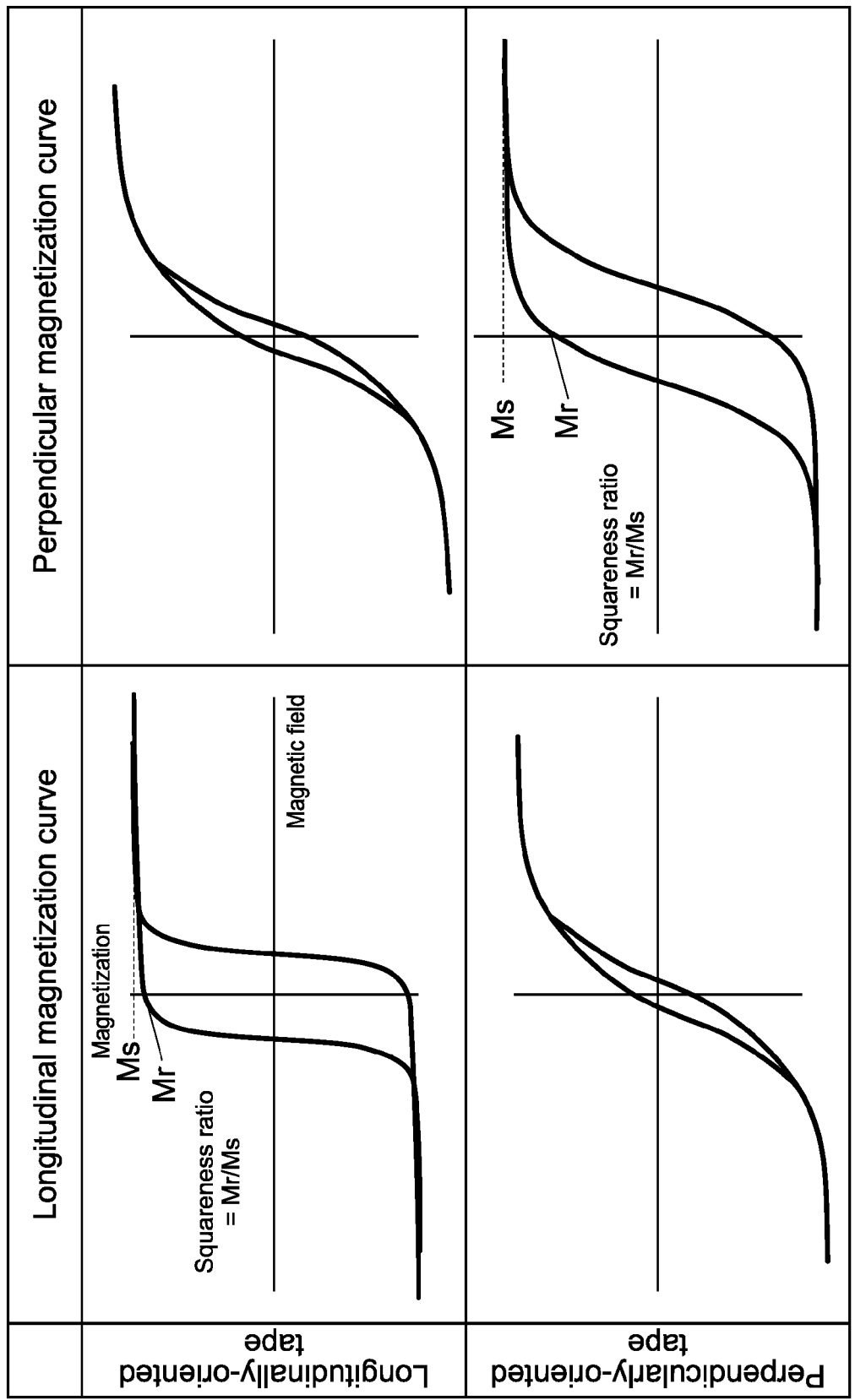
FIG. 12 is a figure showing the magnetization curves of a longitudinally-oriented tape and a perpendicularly-oriented tape in the longitudinal and perpendicular directions.

The magnetization direction of the servo signals 6 (first direction) differs depending on a squareness ratio of the magnetic layer 4 (see also FIG. 12). For example, typically, the squareness ratios will be different among perpendicularly-oriented barium ferrite, non-oriented barium ferrite, and perpendicularly-oriented acicular metals. In such cases, although the magnetic field would be applied under the same conditions by the servo signal recording unit 13, the magnetization direction of the servo signals 6 (first direction) resulting therefrom would be different among each other. To put it the other way around, if the same squareness ratio and the same conditions regarding the servo signal recording unit 13 were given, the resulting first direction would be the same even if the types of the magnetic tape 1 were different.

Since the magnetization direction of the servo signals 6 (first direction) differs depending on the squareness ratio of the magnetic layer 4, the magnetization direction by pre-processing (second direction) might need to be changed so as to correspond to the magnetization direction of the servo signals 6.

In view of this, in this embodiment, the permanent magnet 12a is configured to be turned about an axis of Y-axis direction. This allows an appropriate adjustment of the direction of the magnetization by pre-processing (second direction), corresponding to the kind of the magnetic tape 1.

Regarding the angle of the permanent magnet 12a, there is a suitable angle range depending on the kind of the magnetic tape 1. As used herein, the angle of the permanent magnet 12a is an angle with respect to a datum angle (0°) used as representing the state where the N pole points toward the feed direction of the magnetic tape 1, and a greater angle indicates the clockwise direction therefrom.

The servo signal recording unit 13 overwrites the servo signals 6 at the magnetic layer 4, which magnetic layer 4 has been magnetized in the second direction by the permanent magnet 12a. Besides, the first direction, which is the magnetization direction of the servo signals 6, would be constant regardless of the second direction, if the squareness ratio of the magnetic layer 4 is the same.

The reproduction head unit 14 may be disposed above the magnetic tape 1 (the magnetic layer 4 side), at the downstream of the servo signal recording unit 13. The reproduction head unit 14 reads the servo signals 6 from the magnetic layer 4 of the magnetic tape 1, which magnetic layer 4 has been pre-processed by the pre-processing unit 12 and has the servo signals 6 recorded thereon by the servo signal recording unit 13. The reproduced waveform of the servo signals 6 read by the reproduction head unit 14 may be displayed on the screen of the display unit.

Typically, the reproduction head unit 14 detects the magnetic flux generated from the surface of the servo bands s when the magnetic layer 4 passes under the reproduction head unit 14. The detected magnetic flux gives the reproduced waveform of the servo signals 6.

Figure 5:
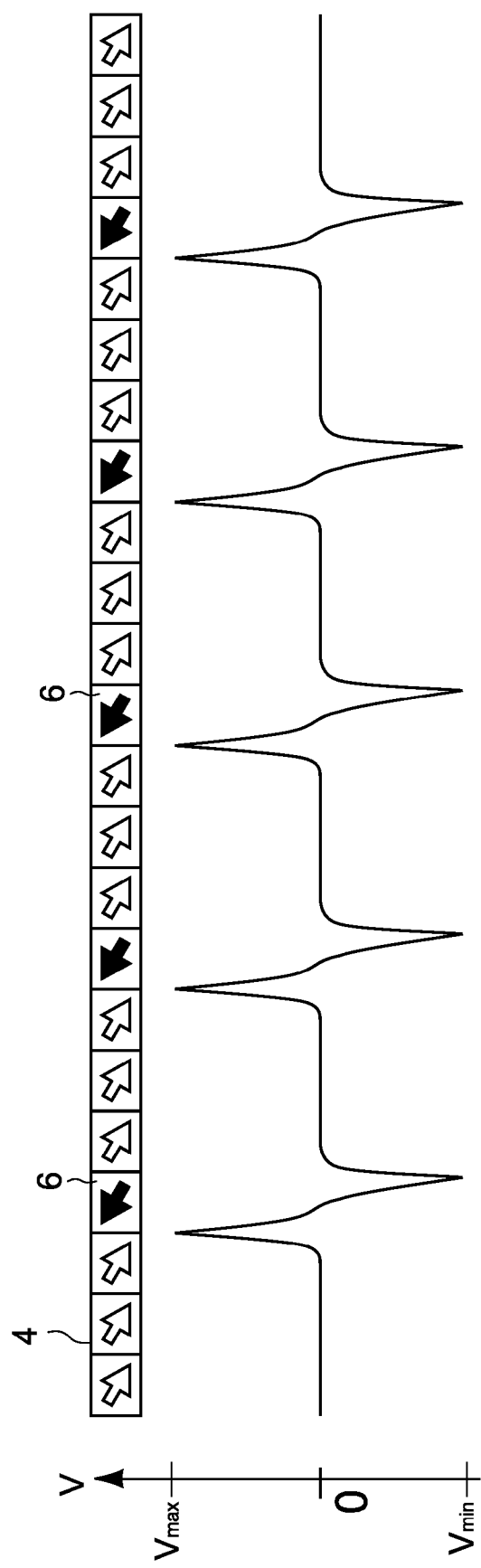
FIG. 5 is a figure showing relationship between the magnetization directions and the reproduced waveform of the servo signals.

FIG. 5 is a figure showing relationship between the magnetization directions and the reproduced waveform of the servo signals 6.

As shown in FIG. 5, in this embodiment, the magnetization direction of the servo signals 6 and the magnetization direction by pre-processing are opposite to each other, and thus it allows the reproduced waveform of the servo signals 6 which results from reading the servo signals 6 to be symmetric in the positive and negative (±) directions. It should be noted that, in cases where the servo signals 6 were to be recorded without pre-processing, the reproduced waveform would become asymmetric in the positive and negative (±) directions since the magnetization direction of servo signals 6 includes a perpendicular component.

Moreover, in this embodiment, it is possible to increase the magnetic flux that would be generated near the surface of the magnetic layer 4. This enables obtaining a high output of the reproduced waveform even in cases where the thickness of the magnetic layer 4 is small.

It should be noted that the magnetization direction of the servo signals 6 (first direction) and the magnetization direction by pre-processing (second direction) are not necessarily strictly opposite but may be substantially opposite. This fact is relevant to the symmetric property of the reproduced waveform of the servo signals 6.

A case where the magnetization direction of the servo signals 6 and the magnetization direction by pre-processing are not precisely opposite, but are slightly shifted, will be assumed. For example, the magnetization direction of a servo signal 6 may be −120° and the magnetization direction by pre-processing may be 50° (see also FIG. 4). Even such cases may also be within the scope of the present disclosure, as long as the reproduced waveform of the servo signal 6 has a symmetry which allows the servo signal 6 to be read appropriately. The reproduced waveform of the servo signal 6 having a symmetry means that the magnetization direction of the servo signal 6 (first direction) and the magnetization direction by pre-processing (second direction) are oriented in the opposite direction.

A way of determining if the reproduced waveform of the servo signal 6 has the symmetry or is asymmetric will be described as follows. For example, if a difference between the maximum voltage value Vmax and the minimum voltage value Vmin (absolute value) of the reproduced waveform is within an allowable range (about 5% to 10%) with respect to the amplitude of the reproduced waveform, the reproduced waveform is determined to have the symmetry.

Examples and Comparative Examples

Next, a variety of Examples and Comparative Examples according to the present disclosure will be described. FIG. 6 is a figure showing Examples and Comparative Examples according to the present disclosure.

First, the present inventors prepared, as the magnetic tapes 1, the following five types of magnetic tapes 1; a non-oriented tape 1A, a non-oriented tape 1B, a perpendicularly-oriented tape 1C, a perpendicularly-oriented tape 1D and a longitudinally-oriented tape 1E. The non-oriented tape 1A included non-oriented barium ferrite as the magnetic powder; and its longitudinal squareness ratio was 0.6. The non-oriented tape 1B included non-oriented barium ferrite as the magnetic powder; and its longitudinal squareness ratio was 0.42. The perpendicularly-oriented tape 1C included perpendicularly-oriented barium ferrite as the magnetic powder; and its longitudinal squareness ratio was 0.22. The perpendicularly-oriented tape 1D included a perpendicularly-oriented acicular metal as the magnetic powder; and its longitudinal squareness ratio was 0.3. The longitudinally-oriented tape 1E included a longitudinally-oriented acicular metal as the magnetic powder; and its longitudinal squareness ratio was 0.88.

The inventors subjected each of these five magnetic tapes 1A to 1E to pre-processing while changing the angle of the permanent magnet 12a of the pre-processing unit 12, followed by recording of the servo signals 6. The non-oriented tape 1A was pre-processed at the angle of the permanent magnet 12a that was changed among a total of seven patterns of the angle: 80°, 70°, 50°, 24°, −10°, −20° and −40°. It should be noted that, in the angle of the permanent magnet 12a, a datum angle (0°) was used as representing the state where the N pole would point toward the feed direction of the magnetic tape 1 (see also FIG. 2).

Similarly, the non-oriented tape 1B was pre-processed at the angle of the permanent magnet 12a that was changed among a total of eight patterns of the angle: 80°, 50°, 24°, 20°, 15°, 0°, −10° and −40°. The perpendicularly-oriented tape 1C was pre-processed at the angle of the permanent magnet 12a that was changed among three patterns of the angle: 30°, 90° and 150°. The perpendicularly-oriented tape 1D was pre-processed at the angle of the permanent magnet 12a that was changed among patterns of the angle: 30°, 90° and 150°. The longitudinally-oriented tape 1E was pre-processed at the angle of the permanent magnet 12a that was changed among three patterns of the angle: −50°, 50° and 120°.

Then, the inventors determined whether or not the reproduced waveform displayed on the screen had an appropriate symmetry, for all of the twenty-four patterns of the above. In an example shown in FIG. 6, when the difference between the maximum voltage value Vmax and the minimum voltage value Vmin (absolute value) of the reproduced waveform was within 5% with respect to the amplitude of the reproduced waveform, the reproduced waveform was determined to have the symmetry. The cases where the reproduced waveform had the symmetry were specified as "Examples". The cases where the reproduced waveform did not have the symmetry were specified as "Comparative Examples".

Figure 7:
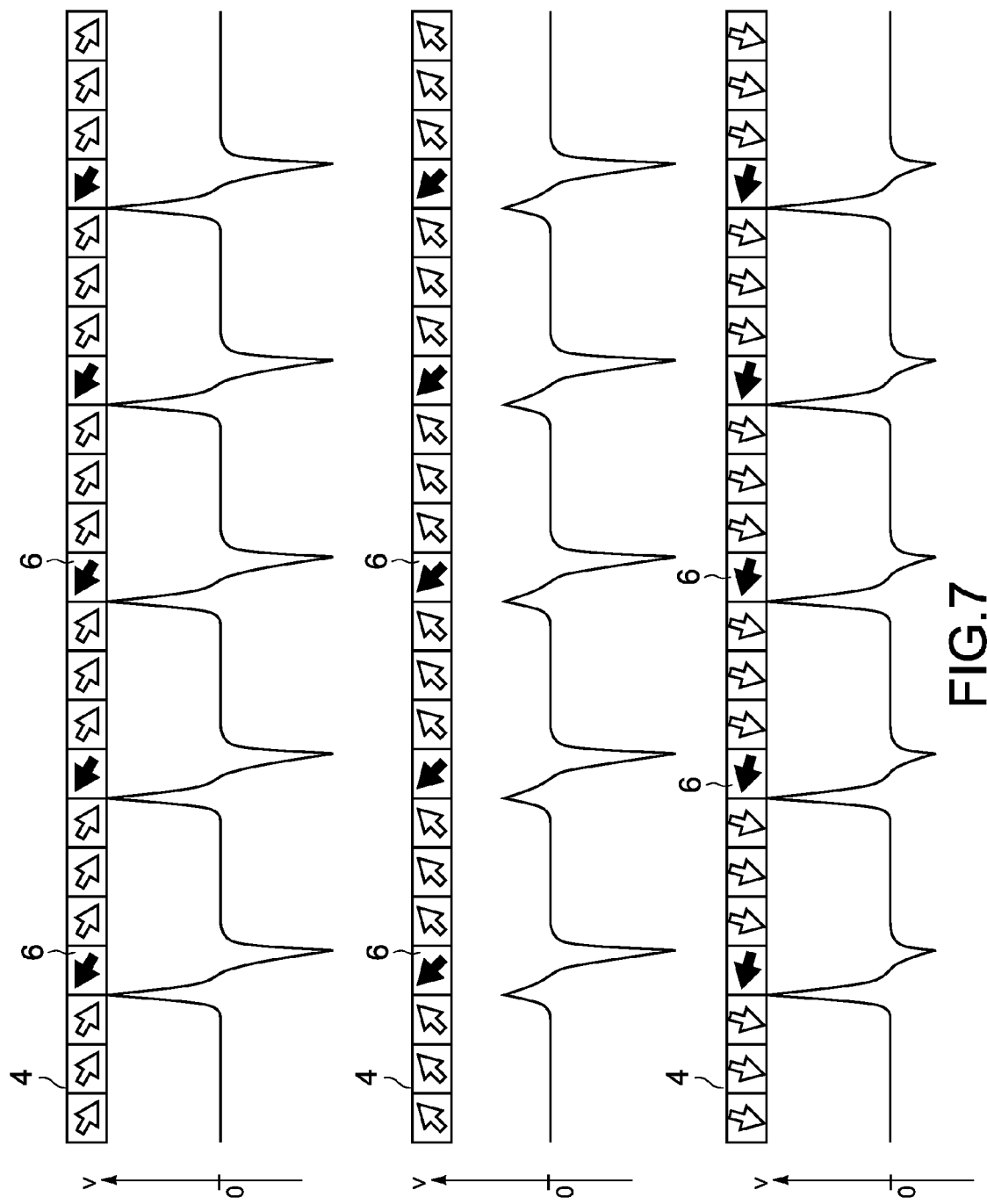
FIG. 7 is a figure showing relationship between the magnetization directions in some non-oriented tapes and the reproduced waveforms.

FIG. 7 is a figure showing relationship between the magnetization directions in the non-oriented tapes 1 and the reproduced waveforms.

In the figure at the top of FIG. 7, an example in which the magnetization direction of the servo signals 6 (first direction) and the magnetization direction by pre-processing (second direction) were appropriately oriented in the opposite direction is illustrated; in which case the reproduced waveform of the servo signals 6 was symmetric in the positive and negative (±) directions. In the figure at the middle of FIG. 7, an example in which the magnetization direction of the servo signals 6 and the magnetization direction by pre-processing were not appropriately oriented in the opposite direction is illustrated; in which case the reproduced waveform of the servo signals 6 was under-biased. In the figure at the bottom of FIG. 7, an example in which the reproduced waveform of the servo signals 6 was over-biased is illustrated.

Figure 8:
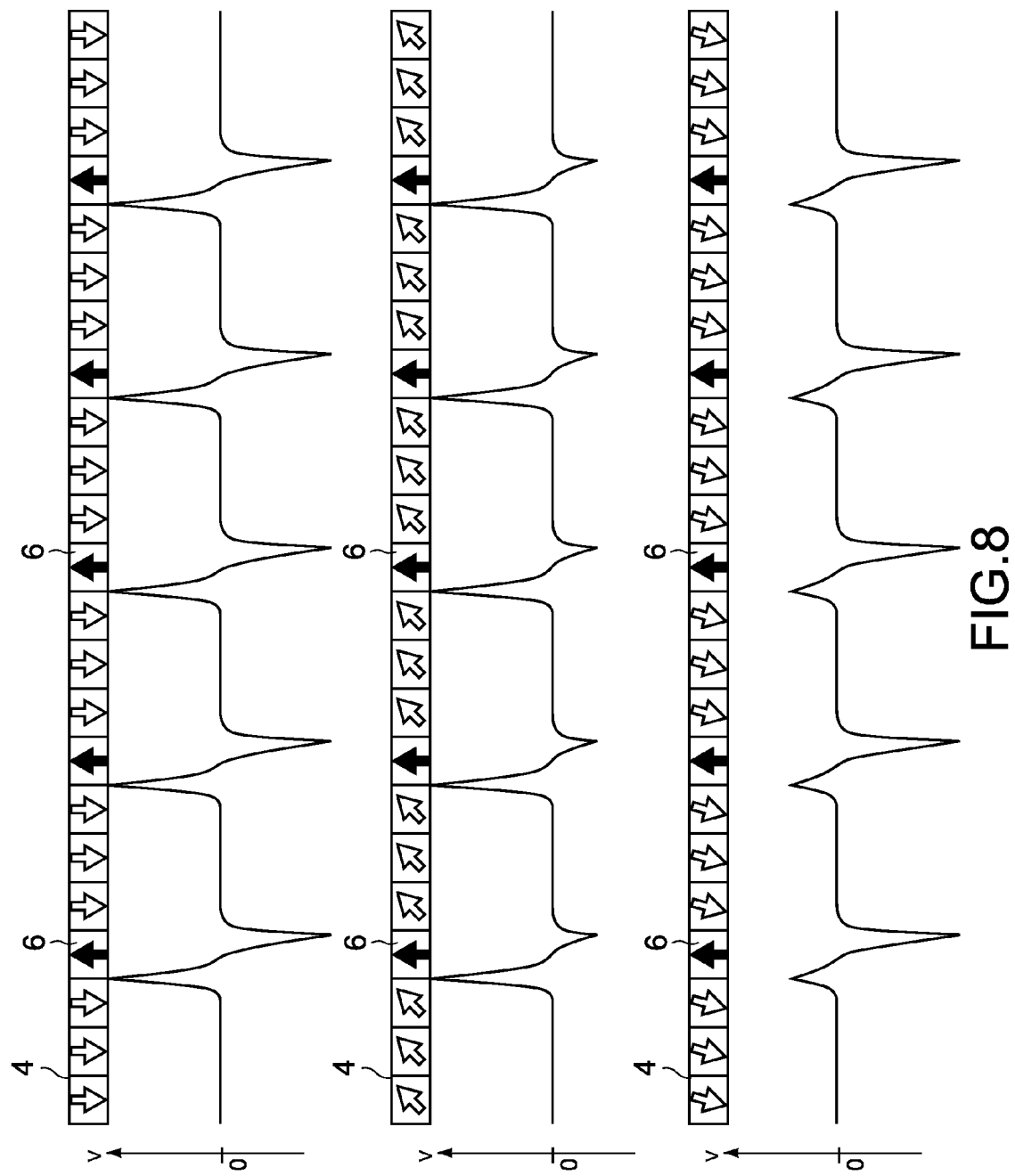
FIG. 8 is a figure showing relationship between the magnetization directions in some perpendicularly-oriented tapes and the reproduced waveforms.

FIG. 8 is a figure showing relationship between the magnetization directions in the perpendicularly-oriented tapes 1 and the reproduced waveforms.

The perpendicularly-oriented tapes 1 shown in FIG. 8 each has a higher degree of perpendicular orientation (lower longitudinal squareness ratio) than the non-oriented tapes 1 which are shown in FIG. 7. Accordingly, in the examples shown in FIG. 8, the magnetization direction of the servo signals 6 is inclined to the perpendicular direction as compared to the examples shown in FIG. 7.

In the figure at the top of FIG. 8, an example in which the magnetization direction of the servo signals 6 and the magnetization direction by pre-processing were appropriately oriented in the opposite direction is illustrated; in which case the reproduced waveform of the servo signals 6 was symmetric in the positive and negative (±) directions. In the figure at the middle of FIG. 8, an example in which the magnetization direction of the servo signals 6 and the magnetization direction by pre-processing were not appropriately oriented in the opposite direction is illustrated; in which case the reproduced waveform of the servo signals 6 was over-biased. In the figure at the bottom of FIG. 8, an example in which the reproduced waveform of the servo signals 6 was under-biased is illustrated.

Next, the inventors cut into a predetermined length each magnetic tape 1 having servo signals 6 recorded thereon. Then, with the use of a vibrating sample magnetometer 20, the inventors measured the amount of magnetization of each magnetic tape 1.

Figure 9:
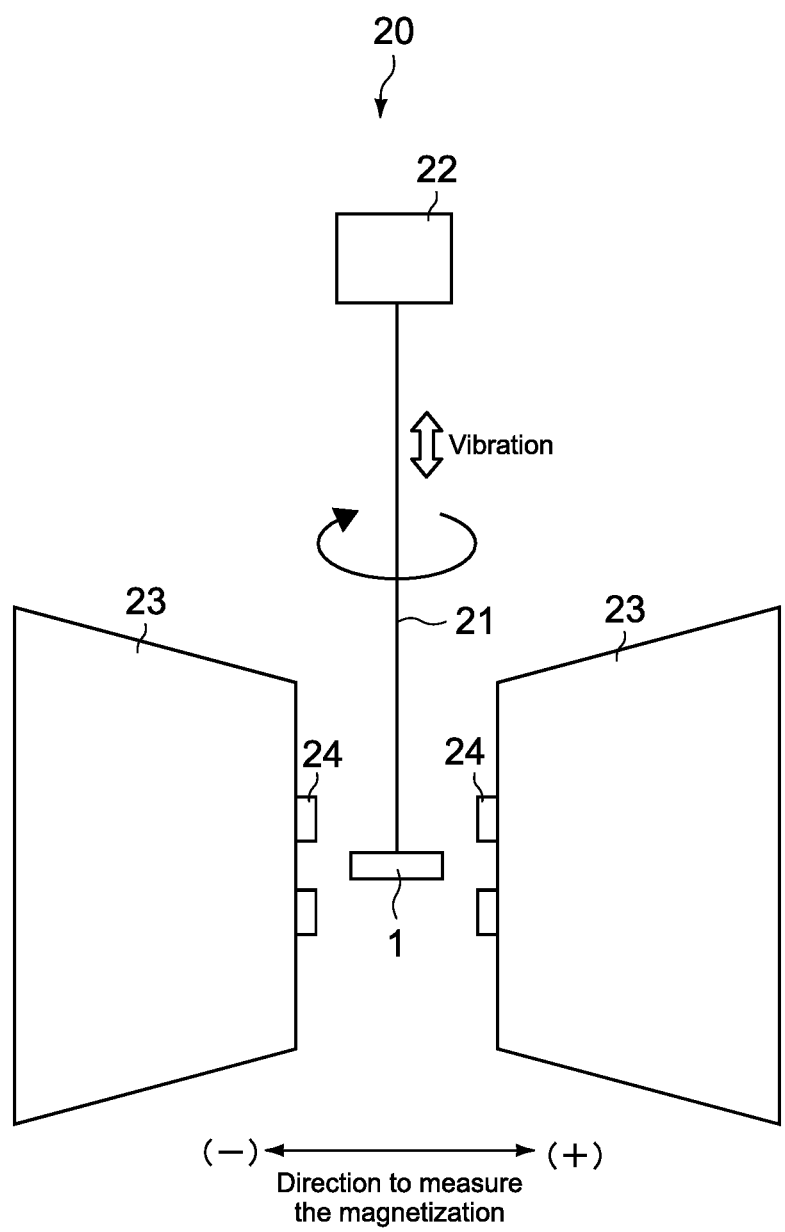
FIG. 9 is a figure showing a vibrating sample magnetometer.

FIG. 9 is a figure showing the vibrating sample magnetometer 20.

As shown in FIG. 9, the vibrating sample magnetometer 20 includes a supporting bar 21 having a lower end portion to which the magnetic tape 1 can be attached; and a vibrating and turning unit 22 which allows the magnetic tape 1 (supporting bar 21) to be vibrated and turned, the vibrating and turning unit 22 being attached to an upper end portion of the supporting bar 21. Further, the vibrating sample magnetometer 20 includes a pair of magnetic field applying coils 23 which produce magnet field around the magnetic tape 1, the magnetic field applying coils 23 being arranged at the positions to sandwich the magnetic tape 1; and a plurality of pickup coils 24 which would measure the amount of magnetization of the magnetic tape 1.

A side surface at the end of a width direction of the magnetic tape 1 would be attached to the lower end portion of the supporting bar 21. Then, the magnetic tape 1 would be turned about an axis of the width direction measured; and the amounts of magnetization thereof would be measured while it was turned.

Figure 10:
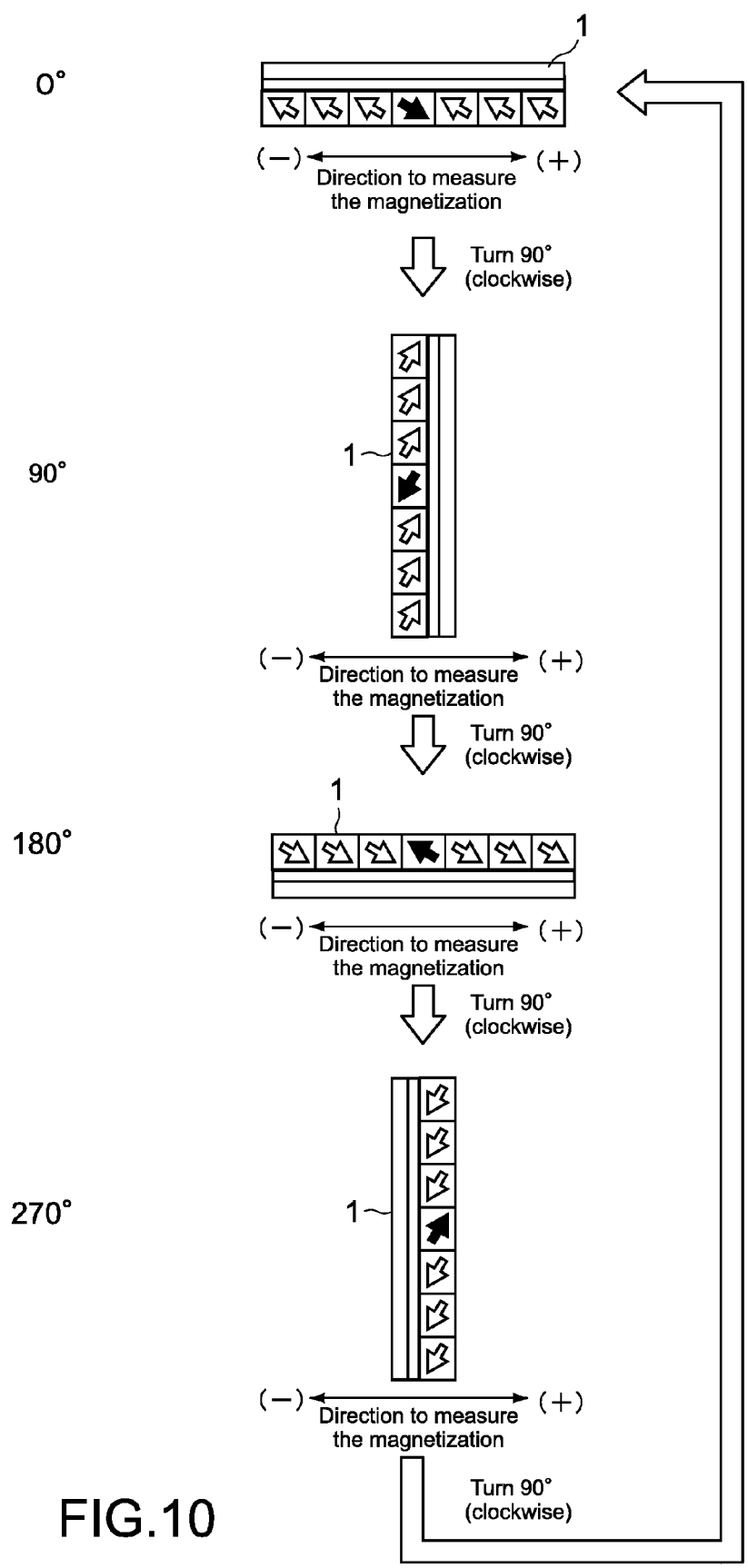
FIG. 10 is a top view showing how the magnetic tape is turned and the amounts of magnetization thereof are measured with turning of the magnetic tape.

FIG. 10 is a top view showing how the magnetic tape 1 was turned and the amounts of magnetization thereof were measured with turning of the magnetic tape 1.

As shown in the figure at the top of FIG. 10, a datum angle (0°) was used as representing the state where the longitudinal direction would be parallel to the direction to measure the amount of magnetization by the vibrating sample magnetometer 20. In addition, when the magnetic tape 1 was at an angle of 0°, the feed direction of the magnetic tape 1 at the time of processing would be the negative (−) direction of the direction to measure the magnetization. From this angle, the magnetic tape 1 would be turned 360° clockwise, and the amounts of magnetization of the magnetic tape 1 at various angles would be measured.

When the amount of magnetization of the magnetic tape 1 would be measured, the magnetization of the whole magnetic layer 4, that is, the magnetization of the combination of the magnetization by pre-processing (white arrows) and the magnetization by servo signals 6 (black arrows) would be measured. Herein, the servo signals 6 had been recorded on the parts of the servo bands s in the magnetic layer 4. Besides, the magnetization by pre-processing had been present over the whole of the servo bands s and the data bands d. Therefore, regarding the magnetic layer 4 as a whole, the magnetization by pre-processing would be dominant, and thus the magnetization by pre-processing would be reflected in the measurement of the amount of magnetization.

Figure 11:
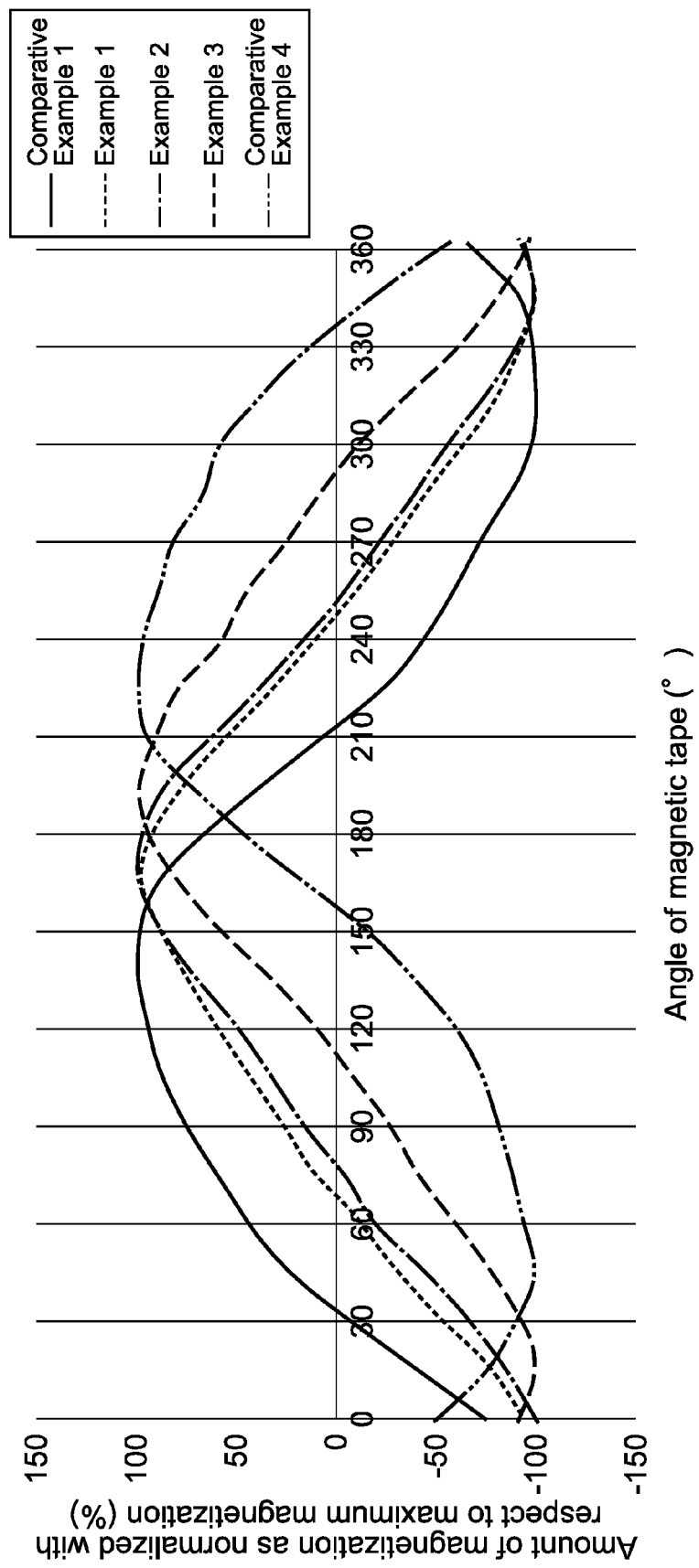
FIG. 11 is a figure showing the results of measurement of the amounts of magnetization of the magnetic tapes.

FIG. 11 is a figure showing the results of measurement of the amounts of magnetization of the magnetic tapes 1.

An abscissa in FIG. 11 indicates the angle of the magnetic tape 1. An ordinate in FIG. 11 indicates the percentage of the amount of magnetization with respect to the maximum amount of magnetization of the magnetic tape 1. In more detail regarding the ordinate, for example, when the amounts of magnetization of the magnetic tape 1 were measured while turning the magnetic tape 1 and the maximum amount of magnetization was obtained at the angle of 160°, each amount of magnetization with respect to this maximum amount at the corresponding angle would be indicated.

FIG. 11 shows the results of measurement for Comparative Example 1, Example 1, Example 2, Example 3 and Comparative Example 4 which were shown in FIG. 6. These examples have a common point that the non-oriented tape 1A (non-oriented barium ferrite, longitudinal squareness ratio of 0.6) was used, but the angle of the permanent magnet 12a in the pre-processing was different among them (80°, 50°, 24°, −10° and −40°).

For example, focusing on Comparative Example 1, a maximum amount of magnetization was obtained when the angle of the magnetic tape 1 was about 140°. Thus, in Comparative Example 1, the magnetization direction of the whole magnetic layer 4 was found to be oriented at about 40° (see also FIG. 4). Similarly, in Example 1, Example 2, Example 3 and Comparative Example 4, the maximum amount of magnetization was obtained when the angles of the magnetic tape 1 were, respectively, about 165°, about 170°, about 195° and about 225°. Thus, it was found that in Example 1, Example 2, Example 3 and Comparative Example 4, the respective magnetization directions of the whole magnetic layer 4 were about 15°, 10°, −15° and −45°.

In FIG. 6, an amount of magnetization obtained when the angle of the magnetic tape 1 was 90° (%) (amount of perpendicular magnetization (%)) is listed for each of Examples and Comparative Examples. The amount of magnetization obtained when the angle of the magnetic tape 1 was 90° (%) is a rate of an amount of magnetization in the perpendicular direction with respect to a maximum amount of magnetization that would be obtained if amounts of magnetization of the magnetic tape 1 were measured while turning the magnetic tape 1.

Next, the squareness ratio will be described. FIG. 12 is a figure showing the magnetization curves of the longitudinally-oriented tape 1 and the perpendicularly-oriented tape 1 in the longitudinal and perpendicular directions. As shown in FIG. 12, the "squareness ratio" is expressed as "remnant magnetization (Mr)/saturation magnetization (Ms)", and this is a value that indicates a tendency to stay magnetized.

The longitudinally-oriented tape 1 has a high squareness ratio in the longitudinal direction (direction parallel to the top surface of the magnetic layer 4) and a low squareness ratio in the perpendicular direction. Therefore, the longitudinally-oriented tape 1 is easy to be magnetized in the longitudinal direction and is difficult to be magnetized in the perpendicular direction. On the other hand, the perpendicularly-oriented tape 1 has a high squareness ratio in the perpendicular direction and a low squareness ratio in the longitudinal direction. Therefore, the perpendicularly-oriented tape 1 is easy to be magnetized in the perpendicular direction and is difficult to be magnetized in the longitudinal direction.

Figure 13:
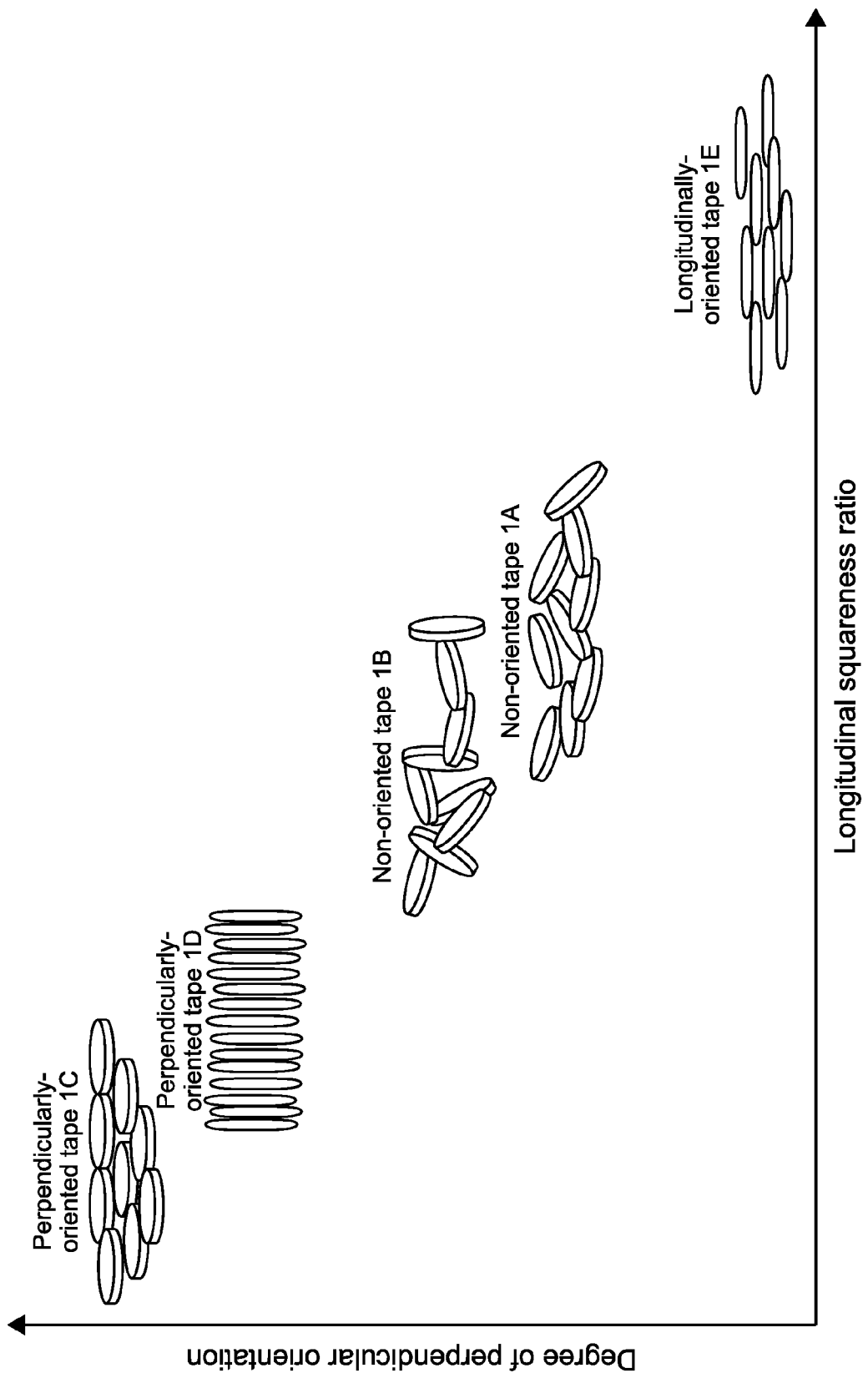
FIG. 13 is a figure showing relationship between longitudinal squareness ratios and degrees of perpendicular orientation.

FIG. 13 is a figure showing relationship between the longitudinal squareness ratios and degrees of perpendicular orientation. It can be understood from FIG. 13 that lower longitudinal squareness ratio results in higher degree of perpendicular orientation; and higher longitudinal squareness ratio results in lower degree of perpendicular orientation.

Figure 14:
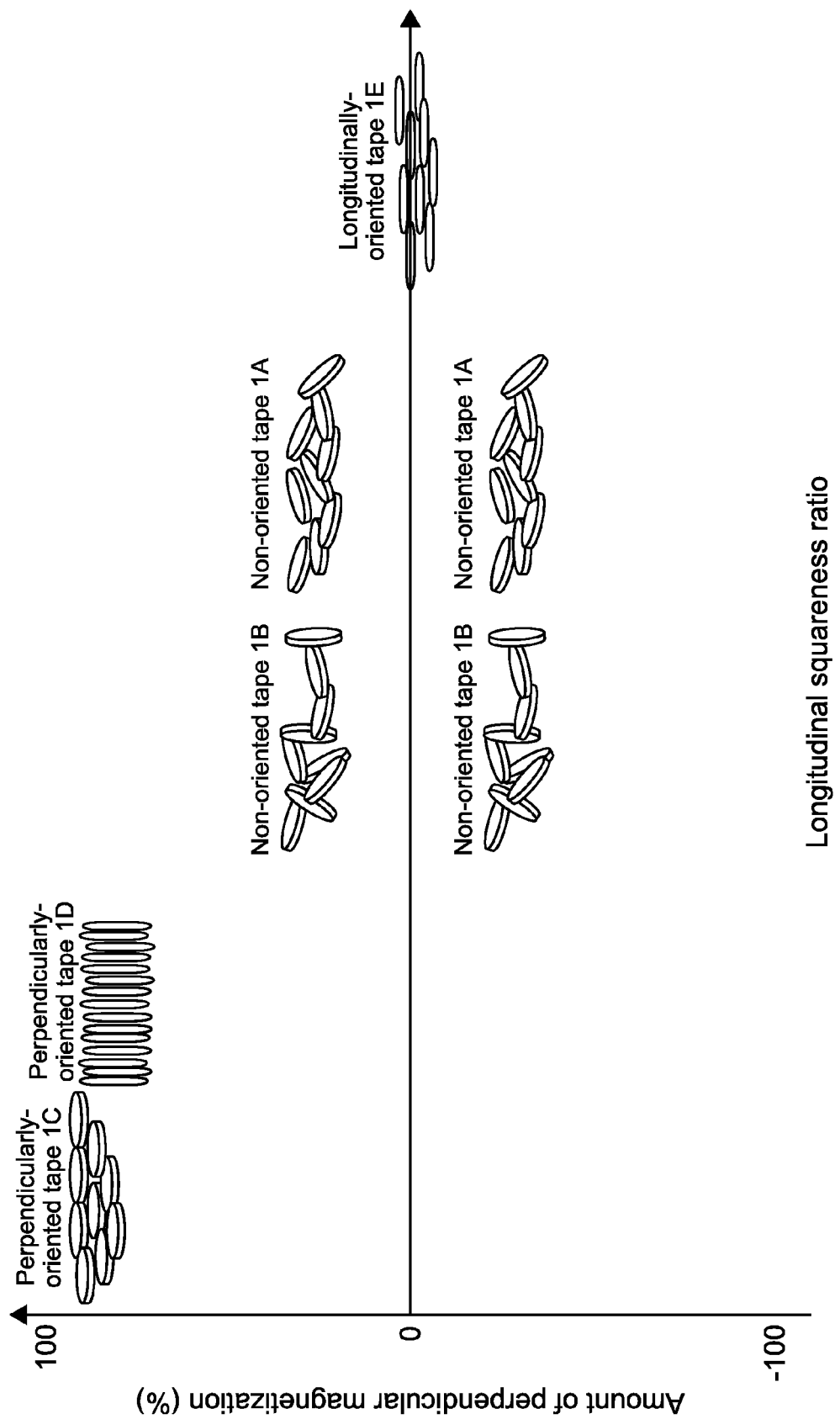
FIG. 14 is a figure showing relationship between longitudinal squareness ratios and amounts of perpendicular magnetization (%)

FIG. 14 is a figure showing relationship between the longitudinal squareness ratios and the amounts of perpendicular magnetization (%). The amount of perpendicular magnetization (%) is a rate of an amount of magnetization in the perpendicular direction with respect to a maximum amount of magnetization that would be obtained if amounts of magnetization of the magnetic tape 1 were measured while turning the magnetic tape 1 (see also FIG. 11). It can be understood from FIG. 14 that lower longitudinal squareness ratio results in higher amount of perpendicular magnetization (%); and higher longitudinal squareness ratio results in lower amount of perpendicular magnetization (%).

In FIG. 6, the product of the squareness ratio in the longitudinal direction and the amount (percentage) of perpendicular magnetization is listed. The results in FIG. 6 revealed that the reproduced waveform of the servo signals 6 with good symmetry would be obtained when the absolute value of the product of the squareness ratio in the longitudinal direction and the amount of perpendicular magnetization (%) was 0.05 or more and 0.25 or less.

Figure 15:
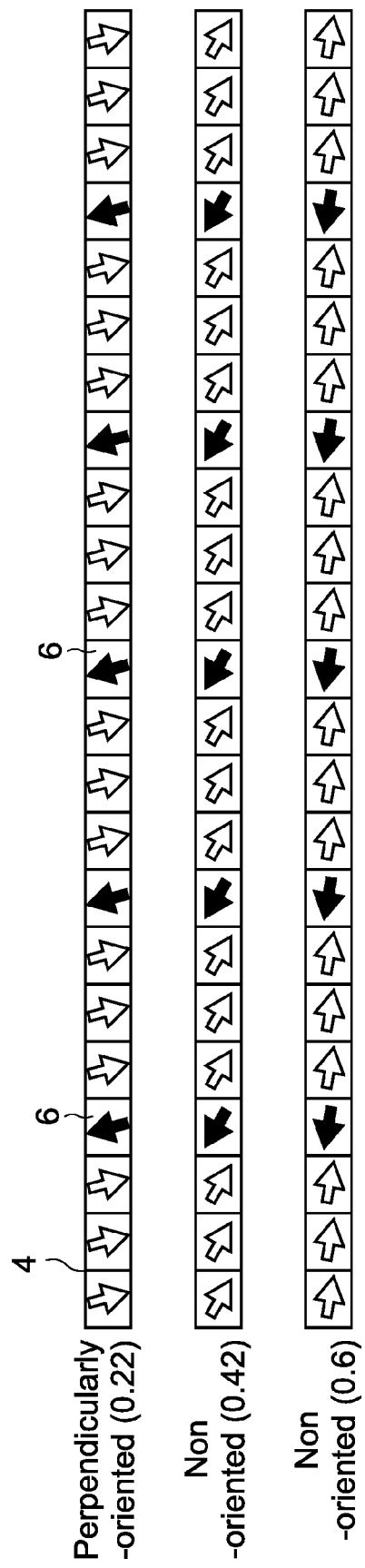
FIG. 15 is a figure for explaining why the product of a longitudinal squareness ratio and an amount of perpendicular magnetization (%) is used.

In the following, it will be explained why the product of a longitudinal squareness ratio and an amount of perpendicular magnetization (%) may be used. FIG. 15 is a figure for explaining why the product of the longitudinal squareness ratio and the amount of perpendicular magnetization (%) is used.

The longitudinal squareness ratio is a ratio of remnant magnetization (Mr) and saturation magnetization (Ms) which indicates a tendency to stay magnetized in the longitudinal direction. In FIG. 15, the number in the parentheses shows the longitudinal squareness ratio. A lower longitudinal squareness ratio indicates higher degree of perpendicular orientation (see also FIG. 13).

The first direction which is the magnetization direction of the servo signals 6 is relevant to the degree of perpendicular orientation (longitudinal squareness ratio) and is dependent on the degree of perpendicular orientation (longitudinal squareness ratio). In other words, the longitudinal squareness ratio is a parameter that determines the first direction which is the magnetization direction of the servo signals 6 (black arrows).

On the other hand, the amount of perpendicular magnetization (%) is the rate of the amount of magnetization in the perpendicular direction with respect to a maximum amount of magnetization that would be obtained if amounts of magnetization of the magnetic tape 1 were measured while turning the magnetic tape 1 (see also FIG. 11). The area magnetized by pre-processing is sufficiently larger than the magnetized area of the servo signals 6. Accordingly, the amount of perpendicular magnetization (%) substantially indicates the perpendicular component of the magnetization by pre-processing. Therefore, the amount of perpendicular magnetization (%) is a parameter that determines the second direction which is the magnetization direction by pre-processing (white arrows).

As shown in FIGS. 14 and 15, as the amount of perpendicular magnetization (%) becomes higher (as the white arrows become closer to perpendicular), the longitudinal squareness ratio becomes lower. In other words, the longitudinal squareness ratio and the amount of perpendicular magnetization (%) are in trade-off relationship.

Thus, in cases where the magnetization direction of the servo signals 6 and the magnetization direction by pre-processing are appropriately oriented in the opposite direction, the absolute value of the product, of the longitudinal squareness ratio that determines the first direction and the amount of perpendicular magnetization (%) that determines the second direction, would fall within a certain range. This range would be the range of 0.05 or more and 0.25 or less, as mentioned above.

[Method for Reducing Distortion in the Reproduced Waveform of the Servo Signals 6]

In the explanation so far, a technique to address the problem that the reproduced waveform resulting from reading the servo signals 6 would become asymmetric in the positive and negative (±) directions, when the magnetization direction of the servo signals 6 includes the perpendicular component, has been illustrated. In the following explanation, on the other hand, a technique to address the problem that the reproduced waveform of the servo signals 6 would be distorted when the magnetization direction of the servo signals 6 includes the perpendicular component will be illustrated.

Now, in order to calculate positional information of the magnetic tape 1 based on the reproduced waveform of the servo signals 6, a typically employed method includes calculating the positional information by using, as the references, a positive output peak value and a negative output peak value. Accordingly, a desirable condition of the reproduced waveform of the servo signals 6 to be satisfied includes high-output (with high absolute values for the positive and negative output peak values) and less distortion in the waveform, as well as having good symmetry of the waveform in the positive and negative (±) directions.

In cases where the magnetization direction of the servo signals 6 has a perpendicular component, while the output of the reproduced waveform of the servo signals 6 can be high, a problem that the reproduced waveform of the servo signals 6 would be more prone to distortion may arise.

On the other hand, when the servo signals 6 are recorded in such a manner as not to contain the perpendicular component, the distortion may be less likely to occur in the reproduced waveform of the servo signals 6. However, it may have a problem that it is difficult to obtain high output of the reproduced waveform of the servo signals 6.

Typically, in many cases, a method that is employed includes recording the servo signals 6 so as not to contain the perpendicular component, compromising high-output in the reproduced waveform of the servo signals 6, in order to reduce distortion in the reproduced waveform of the servo signals 6.

Nevertheless, even in cases where the servo signals 6 are recorded so as to contain the perpendicular component, if the distortion in reproduced waveform of the servo signals 6, it may have been possible to realize both the high-output of the reproduced waveform and good reproduced waveform with less distortion. Hereinafter, a technique to realize both the high-output and less distortion will be described in detail by presenting a specific example.

FIG. 16 is a perspective view showing a servo signal recording unit 13 as viewed from a recording surface 13a side to record the servo signals 6. As shown in FIG. 16, the servo signal recording unit 13 has the recording surface 13a which is configured to record the servo signals 6 onto the magnetic tape 1, while being in contact with the magnetic layer 4 of the magnetic tape 1. This recording surface 13a is provided with five pairs of magnetic gaps 32 formed corresponding to the respective positions of the five servo bands s0 to s4 of the magnetic layer 4 of the magnetic tape 1.

These five pairs of the magnetic gaps 32 are provided along Y-axis direction at predetermined spaces from each other, which Y-axis direction is perpendicular to X-axis direction as the feed direction of the magnetic tape 1. The five pairs of the magnetic gaps 32 may produce a magnetic leakage field, and the magnetic leakage field allows the servo signals 6 to be recorded on the five servo bands s0 to s4. Each pair of the five pairs of the magnetic gaps 32 is made up of two magnetic gaps 32 that are each disposed at an opposite orientation of inclination from each other with a predetermined azimuth angle.

The magnetic gaps 32 are formed in such a manner that each magnetic gap 32 itself has a gap width (in X-direction) of 1 µm or less. Hereinafter, the gap width of the magnetic gap 32 itself will be referred to as a gap length A (see FIG. 18).

In this embodiment, by thus recording the servo signals 6 by the magnetic leakage field occurring from the magnetic gap 32 of 1 µm or less, the magnetization direction of the servo signals 6 is made to contain the perpendicular component. Therefore, in such a manner, the embodiment allows the output by the reproduced waveform of the servo signals 6 to be high-output, by allowing the magnetization direction of the servo signals 6 to contain the perpendicular component.

However, when the gap length A of the magnetic gap 32 is 1 µm or less, and when the magnetization direction of the servo signals 6 simply contains the perpendicular component, typically, there may be a fear of generating distortion in the reproduced waveform of the servo signals 6.

Figure 17:
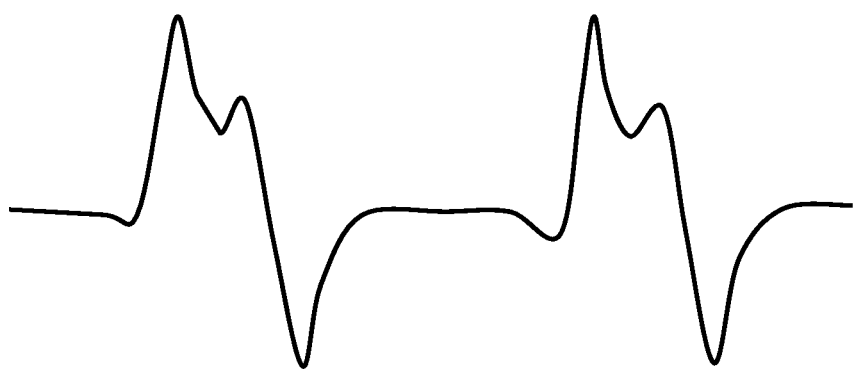
FIG. 17 is a figure showing an example of a case where a distortion has occurred in a reproduced waveform of servo signals.

FIG. 17 is a figure showing an example of a case where a distortion has occurred in the reproduced waveform of the servo signals 6. As shown in FIG. 17, in cases where the magnetization direction of the servo signals 6 contains the perpendicular component, it may give rise to two peak values at positive-output side. If two peak values occur in such a manner, it may result in misdetection of peak positions.

In this embodiment, in order to allow the reproduced waveform of the servo signals 6 to be a good waveform with less distortion, a line width of the servo signals 6, which is substantially equivalent to a "spacing" as will be described later, may be set to 1.2 µm or less. By thus setting the line width of the servo signals 6 to 1.2 µm or less, it makes it possible to reduce distortion in the reproduced waveform of the servo signals 6 even in cases where the servo signals 6 are recorded so as to contain the perpendicular component. As a result, it makes it possible to realize both the high-output of the reproduced waveform and good reproduced waveform with less distortion.

Figure 18:
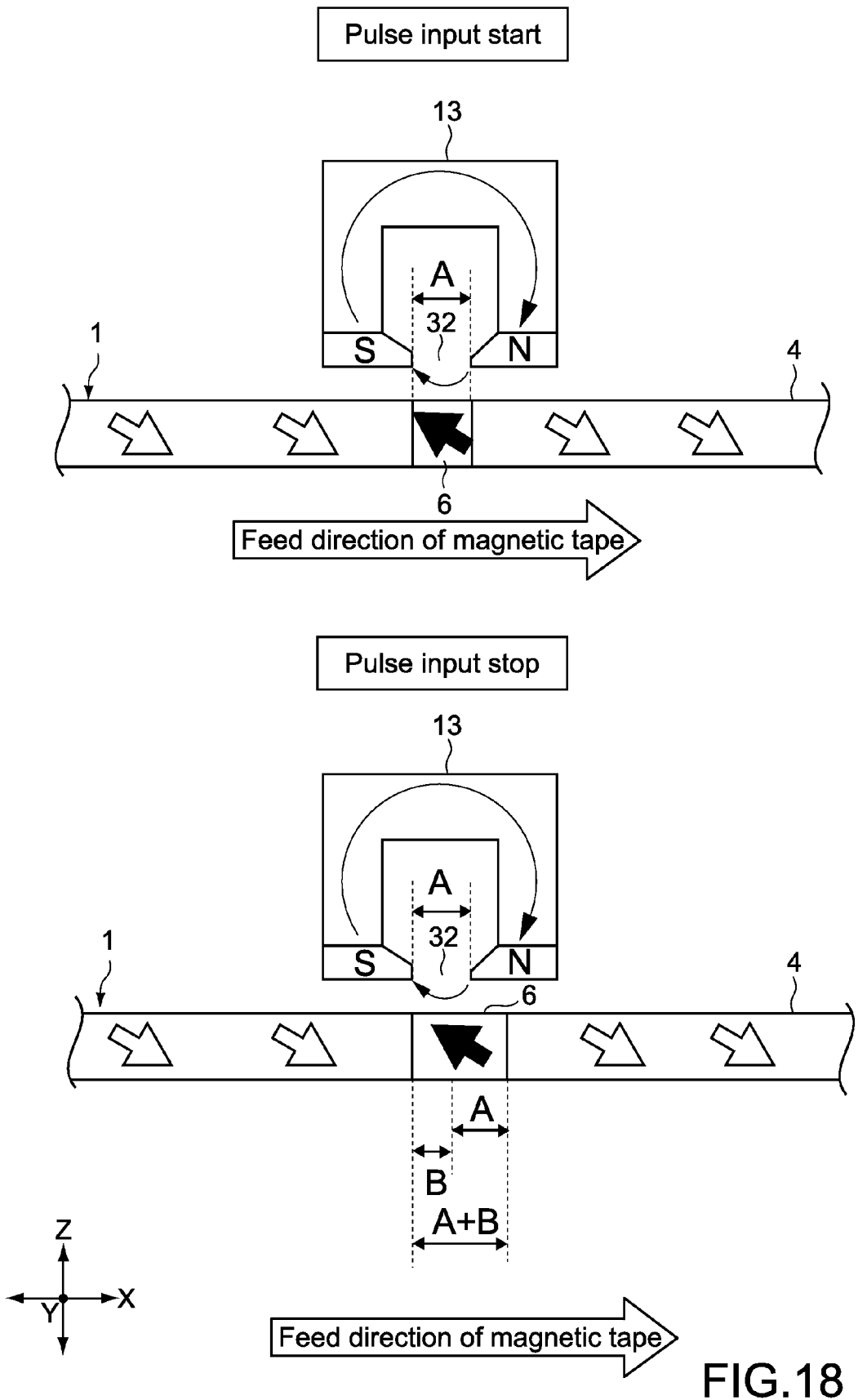
FIG. 18 is a schematic diagram showing how a servo signal is recorded by the servo signal recording unit.

Now, the "line width" regarding the servo signals 6 will be described. FIG. 18 is a schematic diagram showing how the servo signal 6 is recorded by the servo signal recording unit 13. It should be noted that FIG. 18 shows only one magnetic gap 32 out of the two magnetic gaps 32 being disposed at an opposite orientation of inclination from each other with a predetermined azimuth angle, for convenience of illustration. Furthermore, in FIG. 18, a proportion of the gap length A with respect to an entire size of the servo signal recording unit 13 is shown larger than its actual proportion.

The upper figure in FIG. 18 illustrates a state where input of a pulse into the servo signal recording unit 13 has started at a predetermined time and produced a magnetic leakage field, by which a part of the magnetic layer 4 is magnetized in a direction opposite to the magnetization direction by pre-processing. The lower figure in FIG. 18 illustrates a state where input of a pulse into the servo signal recording unit 13 has stopped at a predetermined time and completed recording one line of the servo signal 6.

As shown in FIG. 18, the magnetic tape 1 is moved at a predetermined feed speed along the feed direction of the magnetic tape 1. As shown in the upper figure of FIG. 18, when input of the pulse into the servo signal recording unit 13 starts at the predetermined time, the magnetic leakage field would occur at the magnetic gap 32. At that moment, a part of the magnetic layer 4, which part has a length corresponding to the gap length A of the magnetic gap 32, would be magnetized in the direction opposite to the magnetization direction by pre-processing.

After the start of the input of the pulse as well, the magnetic tape 1 would be moved at the predetermined feed speed along the feed direction. During the magnetic tape 1 is thus being moved, a part of the magnetic layer 4 would be magnetized, by the magnetic leakage field occurring from the magnetic gap 32, in the direction opposite to the magnetization direction by pre-processing. A length of the part of the magnetic layer 4 that would be magnetized with the movement of the magnetic tape 1 is supposed to be a length corresponding to "(pulse input duration)×(feed speed of the magnetic tape 1)". Hereinafter, the length corresponding to "(pulse input duration)×(feed speed of the magnetic tape 1)" will be referred to as "recording-current length B".

As can be understood from the above explanation, the line width of the servo signal 6 may correspond to a value obtained by adding the gap length A of the magnetic gap 32 and the recording-current length B (see the lower figure of FIG. 18). Furthermore, in this embodiment, the pulse input duration (clk) is adjusted in order to record the servo signals 6 having the line width of 1.2 µm or less onto the magnetic layer 4.

Now, the line width of the servo signal 6 may correspond to the value obtained by adding the gap length A of the magnetic gap 32 and the recording-current length B. However, the line width may be somewhat shifted from such a value, due to the following.

Referring to FIG. 18, it will be focused on two boundary areas where the magnetization directions are switched, between the areas magnetized in the first direction (black arrow) and the second direction (white arrow). In such boundary areas (having a predetermined length), the magnetization directions of the magnetic powder may not be oriented in the same direction, but may be oriented in the second direction and the first direction randomly. This would be a cause of some shift which may occur between the line width of the servo signal 6 and the value obtained by adding the gap length A of the magnetic gap 32 and the recording-current length B.

In this embodiment, the line width of the servo signal 6 is set to be narrow (1.2 µm or less). Accordingly, the thickness thereof is not easy to be measured by observation by imaging. However, the line width of the servo signal 6 may be determined according to the reproduced waveform of the servo signal 6.

Figure 19:
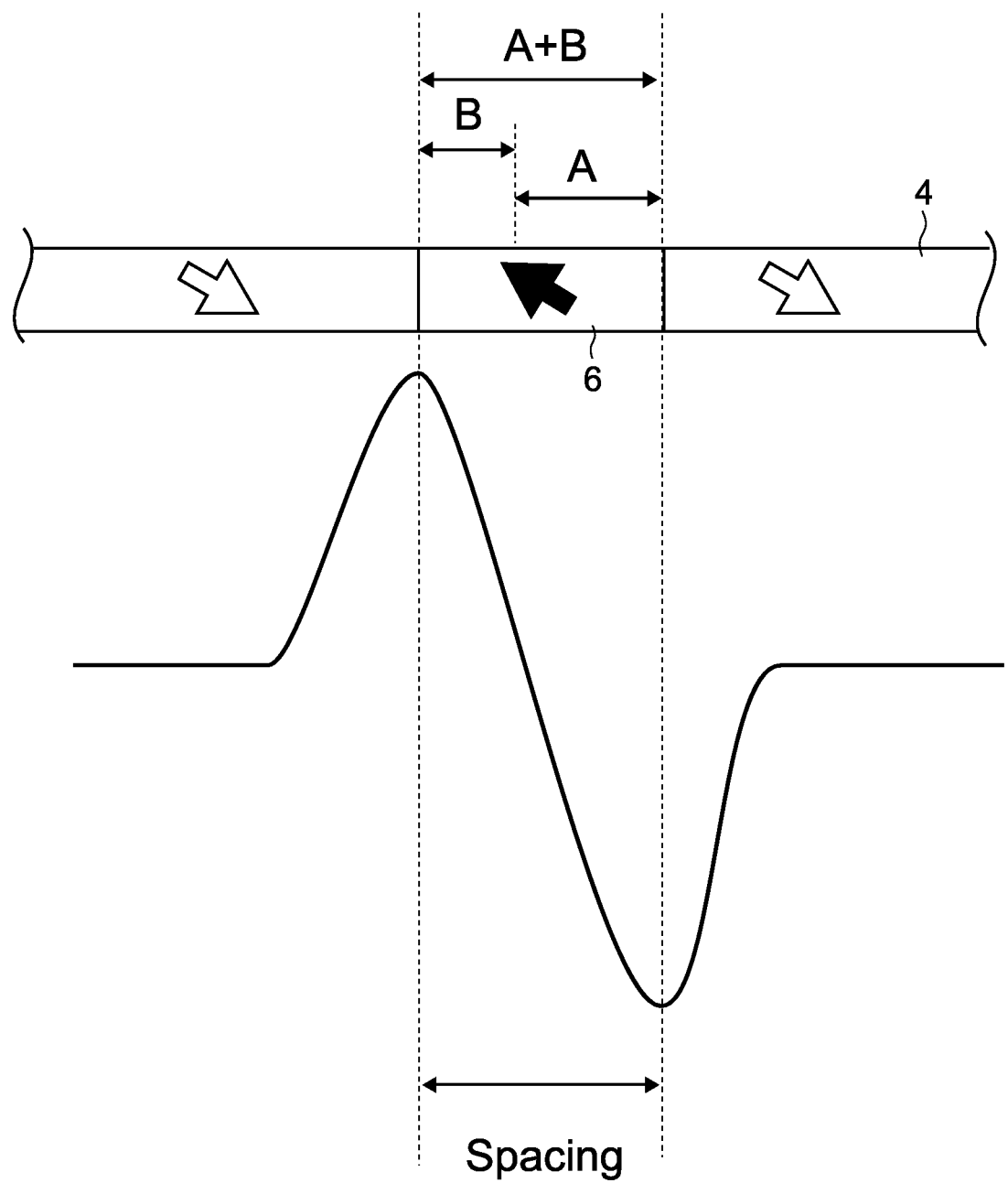
FIG. 19 shows a reproduced waveform resulting from reading, by a reproduction head unit, the servo signal recorded on the magnetic layer.

FIG. 19 is a figure showing the reproduced waveform resulting from reading, by the reproduction head unit 14, the servo signal 6 recorded on the magnetic layer 4. As shown in FIG. 19, the reproduced waveform of the servo signal 6 would have two peak values at the positions corresponding to the respective boundary areas where the magnetization directions are switched (positive output peak value and negative output peak value).

In this embodiment, a value of a distance corresponding to a time, where the time can be indicated by an interval between adjacent positions of positive and negative output peaks, will be referred to as "spacing". That is, the spacing can be expressed as:

Spacing=(time indicated by an interval between positive and negative output peak values)×(feed speed of the magnetic tape 1). The spacing is substantially equivalent to the line width of the servo signal 6. That is to say, the spacing is set to 1.2 µm or less in this embodiment.

The spacing can be determined, for example, in the following manner. First, some reproduced waveforms of the servo signals 6 are digitized by a data acquisition board, and the output peak values of the reproduced waveforms are calculated. Then, a difference value between a time which corresponds to the positive output peak value and a time which corresponds to the negative output peak value is calculated. After that, n pieces of difference values are averaged (for example, n=30). By multiplying the resulting average value by the feed speed of the magnetic tape 1, the spacing can be obtained.

Hereinafter, the basis of setting the line width (i.e., spacing) of the servo signal 6 to 1.2 µm or less will be described.

Figure 20:
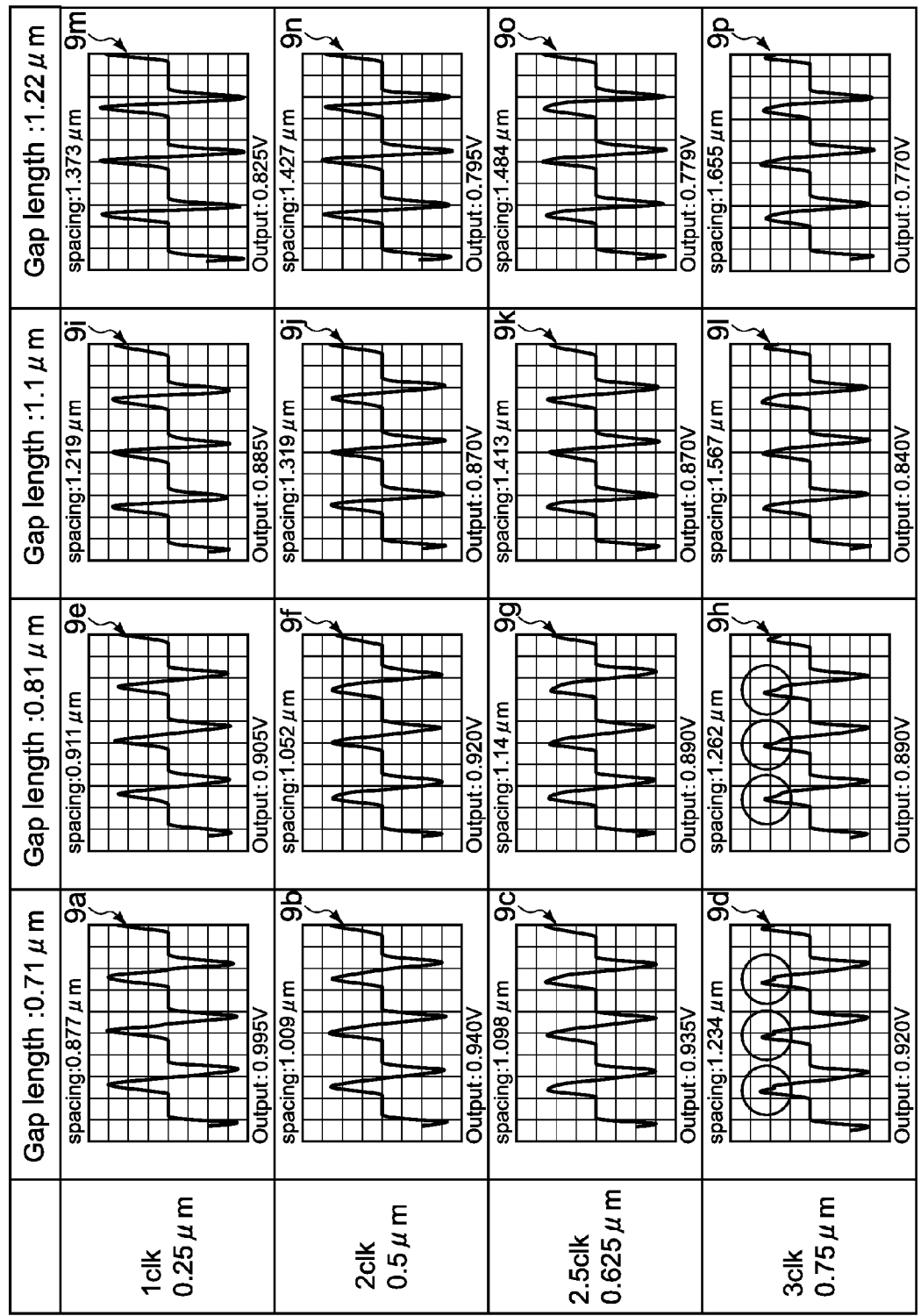
FIG. 20 shows a result of an experiment to find how narrow the line width of a servo signal may be for obtaining a good reproduced waveform.

The inventors carried out an experiment to find how narrow the line width (i.e., spacing) of the servo signal 6 may be for obtaining a good reproduced waveform. FIG. 20 shows the result of this experiment.

In this experiment, first, the inventors prepared a plurality of different servo signal recording units 13 having their respective gap lengths A of the magnetic gaps 32. Specifically, four servo signal recording units 13 having their respective gap lengths A of the magnetic gaps 32 of 0.71 µm, 0.81 µm, 1.1 µm and 1.22 µm were prepared.

Next, with respect to each of the plurality of servo signal recording units 13, by changing the pulse input durations (clk) to obtain variations in the resulting recording-current lengths B, the inventors recorded the servo signals 6 having different line widths onto the magnetic layer 4. Specifically, the pulse input durations were 1 clk, 2 clk, 2.5 clk and 3 clk. When the pulse input durations were 1 clk, 2 clk, 2.5 clk and 3 clk, the recording-current lengths B (=pulse input duration× feed speed of the magnetic tape 1) would be, respectively, 0.25 µm, 0.5 µm, 0.625 µm and 0.75 µm.

The reproduced waveforms resulting from reading, by the reproduction head unit 14, the servo signals 6 that were recorded on the magnetic tape 1 under different conditions, are shown in FIG. 20.

In FIG. 20, the reproduced waveforms 9a to 9d, 9e to 9h, 9i to 9l and 9m to 9p, which are arranged in the corresponding vertical row, show the waveforms resulting from reading the servo signals 6 that were recorded on the magnetic layer 4 by the magnetic leakage field occurring from the magnetic gap 32 with the gap lengths A respectively of 0.71 µm, 0.81 µm, 1.1 µm and 1.22 µm.

Further, in FIG. 20, the reproduced waveforms 9a to 9m, 9b to 9n, 9c to 9o and 9d to 9p, which are arranged in the corresponding horizontal row, show the waveforms resulting from reading the servo signals 6 that were recorded on the magnetic layer 4 at the pulse input durations respectively of 1 clk, 2 clk, 2.5 clk and 3 clk.

The outputs of the reproduced waveforms 9a to 9p were respectively 0.995V, 0.940V, 0.935V, 0.920V, 0.905V, 0.920V, 0.890V, 0.890V, 0.855V, 0.870V, 0.870V, 0.840V, 0.825V, 0.795V, 0.779V and 0.770V.

The spacings (i.e., line widths of the servo signal 6) were respectively 0.877 µm, 1.009 µm, 1.098 µm, 1.234 µm, 0.911 µm, 1.052 µm, 1.14 µm, 1.262 µm, 1.219 µm, 1.319 µm, 1.413 µm, 1.567 µm, 1.373 µm, 1.427 µm, 1.484 µm and 1.655 µm.

Referring to FIG. 20, it was found that a narrower gap length A of the magnetic gap 32 showed higher output of the reproduced waveform. This may be because the perpendicular component in the magnetization direction would gradually increase with the narrowing of the gap length A of the magnetic gap 32. In particular, in cases where the gap length A of the magnetic gap 32 is 1 µm or less, the perpendicular component would obviously be contained in the magnetization direction of the servo signals 6.

Accordingly, in this embodiment, by setting the gap length A of the magnetic gap 32 to 1 µm or less, it allows the magnetization direction of the servo signals 6 to contain the perpendicular component. This may improve the output of the reproduced waveform of the servo signals 6.

Incidentally, a shorter pulse input duration (clk) would lead to higher output of the servo signals 6 when the gap length A of the magnetic gap 32 is the same.

Besides, as an explanation of distortion in the reproduced waveform of the servo signals 6, the following can be mentioned. As the gap length A of the magnetic gap 32 becomes narrower, and as the perpendicular component in the magnetization direction gradually increases, the waveform would be more prone to distortion. For example, referring to the four reproduced waveforms 9d, 9h, 9l and 9p shown in the bottom row of FIG. 20, it was found that a narrower gap length A of the magnetic gap 32, which caused the perpendicular component in the magnetization direction to gradually increase, resulted in greater distortion in the reproduced waveform.

In particular, in each of the reproduced waveforms 9d and 9h, the distortion was relatively large, and two peak values were found at the positive-output side. If two peak values occur in such a manner, it may result in misdetection of peak positions.

However, in the reproduced waveforms, as the pulse input duration becomes shorter and the spacing (line width of the servo signal 6) becomes narrower, the distortion would be smaller. In this embodiment, such a relationship is used. This makes it possible to realize both the high-output of the reproduced waveform and good reproduced waveform with less distortion.

Now, focusing on the reproduced waveforms 9d and 9c, for example, in the reproduced waveforms 9d, the spacing (line width of the servo signal 6) was 1.234 µm. The spacing was so wide that the reproduced waveform of the servo signal 6 was distorted. In contrast, as shown by the reproduced waveforms 9c, when the pulse input duration was made shorter (2.5 clk) and the spacing (line width of the servo signal 6) was 1.098 µm, the reproduced waveform showed a good waveform with less distortion.

Similarly, focusing on the reproduced waveforms 9h and 9g, for example, in the reproduced waveforms 9h, the spacing (line width of the servo signal 6) was 1.262 µm. The spacing was so wide that the reproduced waveform of the servo signal 6 was distorted. In contrast, when the pulse input duration was made shorter (2.5 clk) and the spacing (line width of the servo signal 6) was 1.14 µm, the reproduced waveform showed a good waveform with less distortion.

This result suggests that even if the gap length A was set to 1 µm and the magnetization direction of the servo signals 6 contained the perpendicular component, a good reproduced waveform with less distortion may be realized by setting the spacing (line width of the servo signal 6) to 1.2 µm or less.

Therefore, in this embodiment, the spacing (line width of the servo signal 6) is set to 1.2 µm or less. In addition, by setting the spacing to 1.1 µm or less, it may make it possible to realize even better reproduced waveform with less distortion (see reproduced waveforms 9a, 9b, 9c, 9e and 9f). Furthermore, by setting the spacing to 1.0 µm or less, it may make it possible to realize even better reproduced waveform with less distortion (see reproduced waveforms 9a and 9e).

Figure 21:
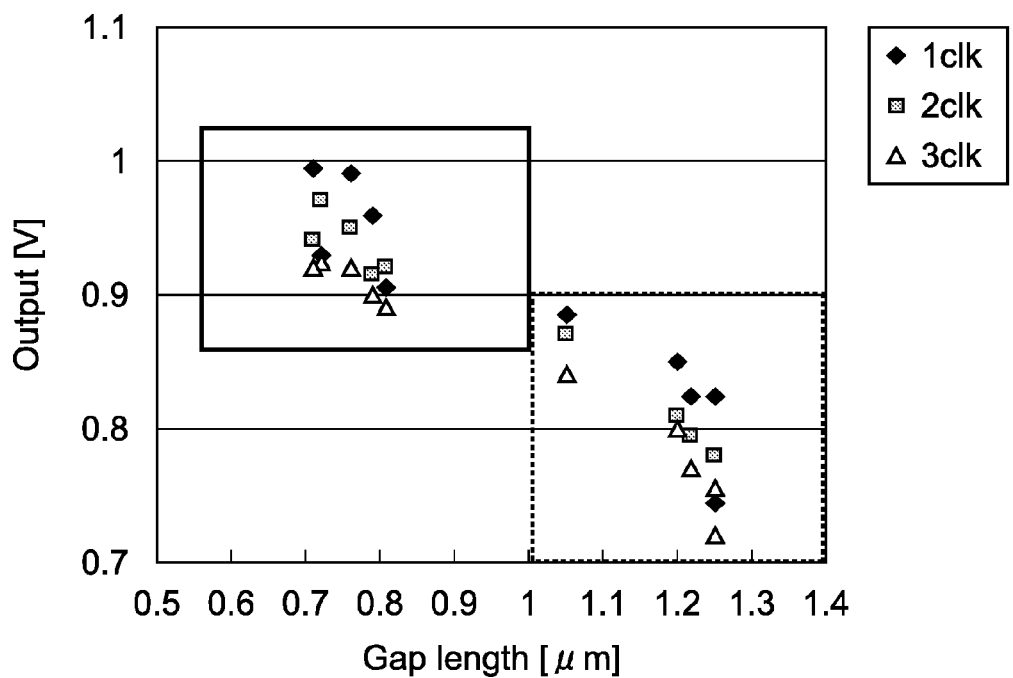
FIG. 21 is a figure showing relationship between gap lengths of a magnetic gap and outputs of the reproduced waveform of the servo signals.

FIG. 21 is a figure showing relationship between the gap lengths A of the magnetic gap 32 and outputs of the reproduced waveform of the servo signals 6.

As shown in FIG. 21, a narrower gap length A of the magnetic gap 32 would lead to higher output of the reproduced waveform. In addition, a shorter pulse input duration (clk) would lead to higher output of the servo signals 6 when the gap length A was the same.

Incidentally, in FIG. 21, the plots indicating the cases where the gap lengths A were greater than 1 µm are surrounded by a broken-line frame. The plots indicating the cases where the gap lengths A were 1 µm or less are surrounded by a solid-line frame.

Figure 22:
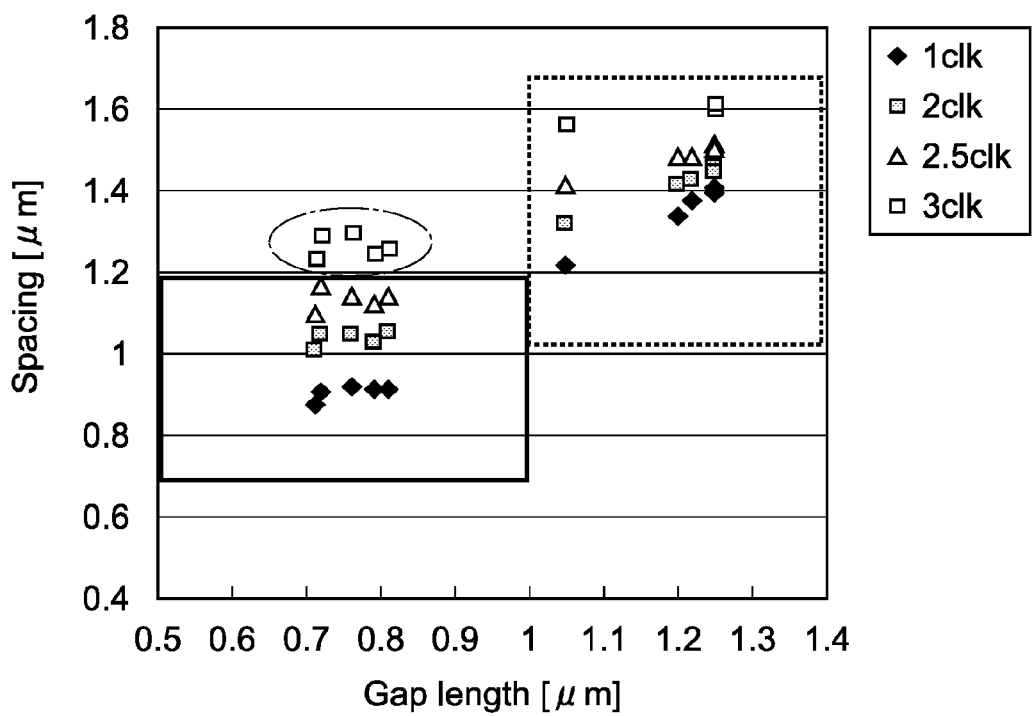
FIG. 22 is a figure showing relationship between gap lengths of a magnetic gap and spacings (line widths of a servo signal).

FIG. 22 is a figure showing relationship between the gap lengths A of the magnetic gap 32 and the spacings (line widths of the servo signal 6).

As shown in FIG. 22, a wider gap length A of the magnetic gap 32 would make the spacing (line widths of the servo signal 6) wider. In addition, a shorter pulse input duration (clk) would lead to narrower spacing (line width of the servo signal 6) when the gap length A was the same.

In FIG. 22, the plots indicating the cases where the gap lengths A of the magnetic gap 32 were greater than 1 µm are surrounded by a broken-line frame. The plots indicating the cases where the gap lengths A of the magnetic gap 32 were 1 µm or less but where the spacings were greater than 1.2 µm, which would generate a distortion in the reproduced waveform, are surrounded by a dashed-line frame. Further, in FIG. 22, the plots indicating the cases where the gap lengths A of the magnetic gap 32 were 1 µm or less and the spacings were 1.2 µm or less are surrounded by a solid-line frame. For these plots that are surrounded within the solid-line frame, it may be possible to realize both the high-output of the reproduced waveform and good reproduced waveform with less distortion.

In the above explanation, the cases where the reproduced waveform of the servo signals 6 was to be reproduced by the reproduction head unit 14 of the servo signal recording apparatus 100 has been illustrated. However, the reproduced waveform of the servo signals 6 may also be reproduced by a different reproduction head unit provided in an apparatus separate from the servo signal recording apparatus 100.

[Various Modifications]

The present disclosure may employ the following configurations.

(1) A magnetic recording medium including:
a magnetic layer having a servo signal recorded thereon by magnetizing a part of the magnetic layer in a first direction, the first direction containing a component of a perpendicular direction that is perpendicular to a top surface of the magnetic layer, the magnetic layer being pre-magnetized in a second direction before recording of the servo signal, the second direction containing the component of the perpendicular direction, which second direction is opposite to the first direction.

(2) The magnetic recording medium according to (1), in which
an absolute value of the product of
a rate of an amount of magnetization in the perpendicular direction with respect to a maximum amount of magnetization that would be obtained if amounts of magnetization of the magnetic recording medium were measured while turning the magnetic recording medium; and
a squareness ratio of the magnetic layer in a longitudinal direction that is parallel to the top surface
is 0.05 or more and 0.25 or less.

(3) The magnetic recording medium according to (1) or (2), in which
the magnetic layer contains therein a magnetic powder which is non-oriented or perpendicularly-oriented.

(4) The magnetic recording medium according to (3), in which
the magnetic powder includes barium ferrite or an acicular metal.

(5) A servo signal recording apparatus including:
a servo signal recording unit configured to apply a magnetic field to a part of a magnetic layer included in a magnetic recording medium, thereby recording a servo signal by magnetizing a part of the magnetic layer in a first direction, the first direction containing a component of a perpendicular direction that is perpendicular to a top surface of the magnetic layer; and
a pre-processing unit configured to apply a magnetic field to the magnetic layer before the servo signal is recorded by the servo signal recording unit, thereby pre-magnetizing the magnetic layer in a second direction, the second direction containing the component of the perpendicular direction, which second direction is opposite to the first direction.

(6) The servo signal recording apparatus according to (5), in which
the pre-processing unit has a magnet which can be turned and can change the magnetic field to be applied to the magnetic layer in accordance with its turning.

(7) A method of producing a magnetic recording medium, the method including:
applying a magnetic field to a part of a magnetic layer included in a magnetic recording medium, thereby recording a servo signal by magnetizing a part of the magnetic layer in a first direction, the first direction containing a component of a perpendicular direction that is perpendicular to a top surface of the magnetic layer; and
applying a magnetic field to the magnetic layer before recording of the servo signal, thereby pre-magnetizing the magnetic layer in a second direction, the second direction containing the component of the perpendicular direction, which second direction is opposite to the first direction.

(8) A magnetic recording medium including:
a magnetic layer having a servo signal recorded thereon by a magnetic leakage field occurring from at least one magnetic gap, the magnetic gap itself having a gap width of 1 µm or less,
the servo signal being configured to allow a reproduced waveform, resulting from reading the servo signal, to have a distance indicated by an interval between adjacent positive and negative output peaks of 1.2 µm or less.

(9) The magnetic recording medium according to (8), in which
the distance indicated by the interval between the adjacent positive and negative output peaks is 1.1 µm or less.

(10) The magnetic recording medium according to (9), in which
the distance indicated by the interval between the adjacent positive and negative output peaks is 1.0 µm or less.

(11) The magnetic recording medium according to (8) to (10), in which
the servo signal is recorded on the magnetic layer by magnetizing a part of the magnetic layer in a first direction, the first direction containing a component of a perpendicular direction that is perpendicular to a top surface of the magnetic layer, the magnetic layer being pre-magnetized in a second direction before recording of the servo signal, the second direction containing the component of the perpendicular direction, which second direction is opposite to the first direction.

(12) A servo signal recording apparatus including:
a servo signal recording unit provided with at least one magnetic gap, the magnetic gap itself having a gap width of 1 µm or less, the magnetic gap being configured to produce a magnetic leakage field to record a servo signal onto a magnetic layer included in a magnetic recording medium, so that the recorded servo signal allows a reproduced waveform, resulting from reading the servo signal, to have a distance indicated by an interval between adjacent positive and negative output peaks of 1.2 µm or less.

(13) A method of producing a magnetic recording medium, the method including:
recording a servo signal onto a magnetic layer included in a magnetic recording medium by a magnetic leakage field occurring from at least one magnetic gap, the magnetic gap itself having a gap width of 1 µm or less, so that the recorded servo signal allows a reproduced waveform, resulting from reading the servo signal, to have a distance indicated by an interval between adjacent positive and negative output peaks of 1.2 µm or less.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A magnetic recording medium comprising:
a magnetic layer having a servo signal recorded thereon by magnetizing a part of the magnetic layer in a first direction, the first direction containing a component of a perpendicular direction that is perpendicular to a top surface of the magnetic layer, the magnetic layer being pre-magnetized in a second direction before recording of the servo signal, the second direction containing the component of the perpendicular direction, which second direction is opposite to the first direction, an absolute value of the product of (1) a rate of an amount of magnetization in the perpendicular direction with respect to a maximum amount of magnetization that would be obtained if amounts of magnetization of the magnetic recording medium were measured while turning the magnetic recording medium and (2) a squareness ratio of the magnetic layer in a longitudinal direction that is parallel to the top surface being 0.05 or more and 0.25 or less.

2. The magnetic recording medium according to claim 1, wherein
the magnetic layer contains therein a magnetic powder which is non-oriented or perpendicularly-oriented.

3. The magnetic recording medium according to claim 2, wherein
the magnetic powder includes barium ferrite or an acicular metal.

4. A servo signal recording apparatus comprising:
a servo signal recording unit configured to apply a magnetic field to a part of a magnetic layer included in a magnetic recording medium, thereby recording a servo signal by magnetizing a part of the magnetic layer in a first direction, the first direction containing a component of a perpendicular direction that is perpendicular to a top surface of the magnetic layer, an absolute value of the product of (1) a rate of an amount of magnetization in the perpendicular direction with respect to a maximum amount of magnetization that would be obtained if amounts of magnetization of the magnetic recording medium were measured while turning the magnetic recording medium and (2) a squareness ratio of the magnetic layer in a longitudinal direction that is parallel to the top surface being 0.05 or more and 0.25 or less; and
a pre-processing unit configured to apply a magnetic field to the magnetic layer before the servo signal is recorded by the servo signal recording unit, thereby pre-magnetizing the magnetic layer in a second direction, the second direction containing the component of the perpendicular direction, which second direction is opposite to the first direction.

5. The servo signal recording apparatus according to claim 4, wherein
the pre-processing unit has a magnet which can be turned and can change the magnetic field to be applied to the magnetic layer in accordance with its turning.

6. A method of producing a magnetic recording medium, the method comprising:
applying a magnetic field to a part of a magnetic layer included in a magnetic recording medium, thereby recording a servo signal by magnetizing a part of the magnetic layer in a first direction, the first direction containing a component of a perpendicular direction that is perpendicular to a top surface of the magnetic layer, an absolute value of the product of (1) a rate of an amount of magnetization in the perpendicular direction with respect to a maximum amount of magnetization that would be obtained if amounts of magnetization of the magnetic recording medium were measured while turning the magnetic recording medium and (2) a squareness ratio of the magnetic layer in a longitudinal direction that is parallel to the top surface being 0.05 or more and 0.25 or less; and
applying a magnetic field to the magnetic layer before recording of the servo signal, thereby pre-magnetizing the magnetic layer in a second direction, the second direction containing the component of the perpendicular direction, which second direction is opposite to the first direction.

7. A magnetic recording medium comprising:
a magnetic layer having a servo signal recorded thereon by a magnetic leakage field occurring from at least one magnetic gap facing the magnetic layer, the magnetic gap having a gap width of 1 µm or less, the servo signal being recorded on the magnetic layer by magnetizing a part of the magnetic layer in a first direction, the first direction containing a component of a perpendicular direction that is perpendicular to a top surface of the magnetic layer, and an absolute value of the product of (1) a rate of an amount of magnetization in the perpendicular direction with respect to a maximum amount of magnetization that would be obtained if amounts of magnetization of the magnetic recording medium were measured while turning the magnetic recording medium and (2) a squareness ratio of the magnetic layer in a longitudinal direction that is parallel to the top surface being 0.05 or more and 0.25 or less,
the servo signal being configured to allow a reproduced waveform corresponding to a pulse input duration, resulting from reading the servo signal, to have a distance indicated by an interval between adjacent positive and negative output peaks of 1.2 µm or less.

8. The magnetic recording medium according to claim 7, wherein
the distance indicated by the interval between the adjacent positive and negative output peaks is 1.1 μm or less.

9. The magnetic recording medium according to claim 8, wherein
the distance indicated by the interval between the adjacent positive and negative output peaks is 1.0 μm or less.

10. The magnetic recording medium according to claim 7, wherein
the magnetic layer is pre-magnetized in a second direction before recording of the servo signal, the second direction containing the component of the perpendicular direction, which second direction is opposite to the first direction.

11. A servo signal recording apparatus comprising:
a servo signal recording unit provided with at least one magnetic gap, the magnetic gap itself having a gap width of 1 μm or less, the magnetic gap being configured to produce a magnetic leakage field to record a servo signal onto a magnetic layer included in a magnetic recording medium by magnetizing a part of the magnetic layer in a first direction, the first direction containing a component of a perpendicular direction that is perpendicular to a top surface of the magnetic layer, and an absolute value of the product of (1) a rate of an amount of magnetization in the perpendicular direction with respect to a maximum amount of magnetization that would be obtained if amounts of magnetization of the magnetic recording medium were measured while turning the magnetic recording medium and (2) a squareness ratio of the magnetic layer in a longitudinal direction that is parallel to the top surface being 0.05 or more and 0.25 or less, so that the recorded servo signal allows a reproduced waveform, resulting from reading the servo signal, to have a distance indicated by an interval between adjacent positive and negative output peaks of 1.2 μm or less.

12. A method of producing a magnetic recording medium, the method comprising:
recording a servo signal onto a magnetic layer included in a magnetic recording medium by a magnetic leakage field occurring from at least one magnetic gap, the magnetic gap itself having a gap width of 1 μm or less, the servo signal being recorded on the magnetic layer by magnetizing a part of the magnetic layer in a first direction, the first direction containing a component of a perpendicular direction that is perpendicular to a top surface of the magnetic layer, and an absolute value of the product of (1) a rate of an amount of magnetization in the perpendicular direction with respect to a maximum amount of magnetization that would be obtained if amounts of magnetization of the magnetic recording medium were measured while turning the magnetic recording medium and (2) a squareness ratio of the magnetic layer in a longitudinal direction that is parallel to the top surface being 0.05 or more and 0.25 or less, so that the recorded servo signal allows a reproduced waveform, resulting from reading the servo signal, to have a distance indicated by an interval between adjacent positive and negative output peaks of 1.2 μm or less.

* * * * *